(12) United States Patent
Santavicca et al.

(10) Patent No.: US 11,540,088 B2
(45) Date of Patent: *Dec. 27, 2022

(54) SYSTEM AND METHOD FOR LOCATING A PORTABLE DEVICE IN DIFFERENT ZONES RELATIVE TO A VEHICLE AND WITH DEVICE ZONE INDICATORS

(71) Applicant: VOXX INTERNATIONAL CORPORATION, Hauppauge, NY (US)

(72) Inventors: Joseph A. Santavicca, Auburn Hills, MI (US); Robert Mahrle, Roseville, MI (US); Tristen Kyle Pierson, Rochester, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/142,465

(22) Filed: Jan. 6, 2021

(65) Prior Publication Data

US 2021/0127233 A1 Apr. 29, 2021

Related U.S. Application Data

(63) Continuation-in-part of application No. 16/707,049, filed on Dec. 9, 2019, now Pat. No. 10,986,466, (Continued)

(51) Int. Cl.
*H04W 4/029* (2018.01)
*H04W 4/02* (2018.01)
(Continued)

(52) U.S. Cl.
CPC .......... *H04W 4/029* (2018.02); *B60R 25/245* (2013.01); *H04B 17/27* (2015.01); *H04B 17/318* (2015.01);
(Continued)

(58) Field of Classification Search
CPC ....... H04W 4/029; H04W 4/023; H04W 4/40; H04W 4/80; H04W 8/005; H04W 64/006;
(Continued)

(56) References Cited

U.S. PATENT DOCUMENTS

| 6,236,365 B1 | 5/2001 | LeBlanc et al. |
| 7,973,657 B2 | 7/2011 | Ayed |

(Continued)

FOREIGN PATENT DOCUMENTS

| WO | 2017066286 | 4/2017 |
| WO | 2017102573 | 6/2017 |
| WO | 2018071671 | 4/2018 |

OTHER PUBLICATIONS

Zhang, Hemin, et al. "A handheld inertial pedestrian navigation system with accurate step modes and device poses recognition." IEEE Sensors Journal 15.3 (2014): 1421-1429. (Year: 2014).*

(Continued)

*Primary Examiner* — Sharad Rampuria
(74) *Attorney, Agent, or Firm* — Allen, Dyer, Doppelt + Gilchrist, P.A. Attorneys at Law

(57) ABSTRACT

A vehicle system may include a plurality of wireless transmitters carried by a vehicle and configured to transmit wireless signals, at least one indicator carried by the vehicle, and a portable device moveable relative to the vehicle and configured to receive the wireless signals from the plurality of wireless transmitters. The system may further include a controller carried by the vehicle and configured to wirelessly communicate with the portable device, and determine a predicted zone the portable device is located in adjacent to the vehicle based upon the received wireless signals, with the predicted zone being one of a plurality of different zones adjacent the vehicle having respective vehicle functions associated therewith. The controller may be further configured to cause the at least one indicator to provide an (Continued)

indication that the portable device has entered the predicted zone, and enable the respective vehicle function associated with the predicted zone.

26 Claims, 17 Drawing Sheets

Related U.S. Application Data which is a continuation-in-part of application No. 16/661,252, filed on Oct. 23, 2019, now Pat. No. 10,917,750, which is a continuation of application No. 16/125,049, filed on Sep. 7, 2018, now Pat. No. 10,542,383, which is a continuation of application No. 15/290,120, filed on Oct. 11, 2016, now Pat. No. 10,075,819.

(60) Provisional application No. 62/957,507, filed on Jan. 6, 2020, provisional application No. 62/239,080, filed on Oct. 8, 2015.

(51) Int. Cl.
| | |
|---|---|
| *H04B 17/318* | (2015.01) |
| *H04W 4/80* | (2018.01) |
| *B60R 25/24* | (2013.01) |
| *H04W 4/40* | (2018.01) |
| *H04B 17/27* | (2015.01) |
| *H04W 8/00* | (2009.01) |

(52) U.S. Cl.
CPC ............. *H04W 4/023* (2013.01); *H04W 4/40* (2018.02); *H04W 4/80* (2018.02); *H04W 8/005* (2013.01)

(58) Field of Classification Search
CPC ................ H04W 24/10; B60R 25/245; B60R 2325/205; H04B 17/27; H04B 17/318; H04L 63/0861; G01S 5/0278; G01S 5/0284
See application file for complete search history.

(56) References Cited

U.S. PATENT DOCUMENTS

| | | |
|---|---|---|
| 8,145,199 B2 | 3/2012 | Tadayon et al. |
| 8,581,713 B1 | 11/2013 | Morgan et al. |
| 9,008,917 B2 | 4/2015 | Gautama et al. |
| 9,725,069 B2 | 8/2017 | Krishnan |
| 9,894,492 B1 | 2/2018 | Elangovan et al. |
| 10,075,819 B2 | 9/2018 | Santavicca et al. |
| 2007/0087756 A1 | 4/2007 | Hoffberg |
| 2008/0014867 A1 | 1/2008 | Finn |
| 2011/0093161 A1 | 4/2011 | Zhou et al. |
| 2011/0172885 A1 | 7/2011 | Fawaz et al. |
| 2012/0135711 A1 | 5/2012 | Jabara et al. |
| 2012/0149341 A1 | 6/2012 | Tadayon et al. |
| 2013/0288692 A1 | 10/2013 | Dupray et al. |
| 2013/0324081 A1 | 12/2013 | Gargi et al. |
| 2014/0011455 A1 | 1/2014 | Hsu et al. |
| 2014/0164559 A1 | 6/2014 | Demeniuk |
| 2014/0188309 A1 | 7/2014 | Caratto et al. |
| 2014/0188348 A1 | 7/2014 | Gautama et al. |
| 2015/0235486 A1 | 8/2015 | Ellis et al. |
| 2015/0269638 A1 | 9/2015 | Chatterton et al. |
| 2016/0006922 A1 | 1/2016 | Boudreau et al. |
| 2016/0127874 A1 | 5/2016 | Kingsmill et al. |
| 2017/0080861 A1 | 3/2017 | Vora et al. |
| 2017/0105101 A1 | 4/2017 | Santavicca |
| 2017/0197584 A1 | 7/2017 | Keating et al. |
| 2018/0288569 A1 | 10/2018 | Wang |
| 2019/0007810 A1 | 1/2019 | Santavicca |
| 2019/0047512 A1 | 2/2019 | Gersabeck et al. |
| 2019/0308614 A1 | 10/2019 | Lavoie et al. |
| 2020/0059769 A1 | 2/2020 | Macneille et al. |
| 2022/0063689 A1* | 3/2022 | Kumar .................. B64D 47/08 |

OTHER PUBLICATIONS

Du et al. "Stacked LSTM deep learning model for traffic prediction in vehicle-to-vehicle communication" 2017 IEEE 86th Vehicular Technology Conference (VTC-Fall). IEEE, 2017. (Year: 2017). SEE U.S. Pat. No. 10,986,466.

"EFOB-Bluetooth Passive Entry System: use your smart phone as a key" Nov. 2017; https://www.voxxautomotive.com; ***See U.S. Appl. No. 16/661,252.

Holcomb et al. "Sustainability-related publications calendar years 2015-2016" Construction Engineering Research Laboratory (US), 2017. (Year: 2017). *** SEE U.S. Pat. No. 10,917,750.

\* cited by examiner

SYSTEM AND METHOD FOR LOCATING A PORTABLE DEVICE IN DIFFERENT ZONES RELATIVE TO A VEHICLE AND WITH DEVICE ZONE INDICATORS

CROSS-REFERENCE TO RELATED APPLICATIONS

This application claims priority to U.S. provisional application 62/957,507 filed Jan. 6, 2020. This application is also a continuation-in-part of U.S. application Ser. No. 16/707, 049 filed Dec. 9, 2019, which is a continuation-in-part of U.S. application Ser. No. 16/661,252 filed Oct. 23, 2019, which is a continuation of U.S. application Ser. No. 16/125, 049 filed Sep. 7, 2018 (now U.S. Pat. No. 10,542,383), which is a continuation of U.S. application Ser. No. 15/290, 120 filed Oct. 11, 2016 (now U.S. Pat. No. 10,075,819), which in turn claims priority to U.S. provisional application No. 62/239,080 filed Oct. 8, 2015, all of which are hereby incorporated herein in their entireties by reference.

BACKGROUND

In vehicle applications, a smart key allows a driver to keep a key fob pocketed when unlocking, locking and starting a vehicle. For example, the key is identified via one of several antennas in the car's bodywork and a radio pulse generator in the key's housing. Depending on the system, the vehicle is automatically unlocked when a button or sensor on the door handle or trunk release is pressed.

Vehicles with a smart key system can disengage the immobilizer and activate the ignition without inserting a key in the ignition, provided the driver has the key inside the car. On most vehicles, this is done by pressing a starter button.

When leaving a vehicle equipped with a smart key system, the vehicle is locked by either pressing a button on one of the door handles, touching a capacitive area on a door handle, or by walking away from a vehicle.

Some vehicles automatically adjust settings based on the smart key used to unlock the car. Such settings may include user preferences such as seat positions, steering wheel position, exterior mirror settings, climate control settings, and stereo presets. Some vehicle models have settings that can prevent the vehicle from exceeding a maximum speed when a certain key is used for starting.

Portable devices, such as smartphones, as well as smartphone applications (or programs running on the portable devices), have become nearly ubiquitous. Smartphone applications have been developed to give smartphones the functionality of a key fob. For example, a smartphone with the appropriate software application can be used in place of an electronic key fob to lock and unlock doors, control a car find feature (e.g., audible horn honk), start a vehicle remotely, or program auxiliary outputs (like trunk release).

Smartphone applications have been developed to receive vehicle information via two-way interfaces connected to a vehicle's OBDII port. OBD may stand for On-board diagnostics. Such a smartphone application can be used to ask for reports that score driver habits for aid in safety coaching, conserving fuel and reducing insurance rates, track vehicle location and help authorities locate the car if it is stolen. Instant alerts can be sent to the smartphone when drivers exceed pre-set geofence boundaries. In addition, the smartphone application can be used to request diagnostic reports on vehicle health and preventative maintenance for tires, brakes, shocks and more.

Smartphone applications may utilize existing communication interfaces in the smartphone and the vehicle. However, these interfaces may not be configured to detect the precise location of the smartphone.

SUMMARY

A vehicle system may include a plurality of wireless transmitters carried by a vehicle and configured to transmit wireless signals, at least one indicator carried by the vehicle, and a portable device moveable relative to the vehicle and configured to receive the wireless signals from the plurality of wireless transmitters. The system may further include a controller carried by the vehicle and configured to wirelessly communicate with the portable device, and determine a predicted zone the portable device is located in adjacent to the vehicle based upon the received wireless signals, with the predicted zone being one of a plurality of different zones adjacent the vehicle having respective vehicle functions associated therewith. The controller may be further configured to cause the at least one indicator to provide an indication that the portable device has entered the predicted zone, and enable the respective vehicle function associated with the predicted zone.

In an example embodiment, one of the plurality of different zones may correspond to a driver side of the vehicle, and the respective vehicle control function for the zone corresponding to the driver side of the vehicle may comprise unlocking at least a driver's door. In accordance with another example, one of the plurality of different zones may correspond to a rear of the vehicle, and the respective vehicle function for the zone corresponding to the rear of the vehicle may comprise actuating at least one of a vehicle trunk and liftgate.

The controller may be configured to determine the predicted zone based upon the received wireless signals and training data determined based upon a machine learning algorithm in some embodiments. By way of example, the machine learning algorithm may comprise at least one of a neural network, a gradient boosting tree, a naïve Bayes classification, a K-nearest neighbor classification, and a support vector machine. Moreover, the machine learning may comprise supervised machine learning, and the controller may comprise a memory storing a previously trained supervised machine learning model, for example.

In an example embodiment, the at least one indicator may comprise at least one underbody light carried underneath the vehicle and directed at the ground. In accordance with another example, the at least one indicator may comprise a respective light corresponding to each of the plurality of different zones. In still another example, the plurality of zones may comprise at least one exterior zone adjacent the vehicle and an interior zone within the vehicle, the at least one indicator may comprise at least one multi-color light, and the controller may be configured to cause the at least one multi-color light to provide different color indications with respect to the at least one exterior zone and the interior zone. Also by way of example, the at least one indicator may comprise at least one of taillights, head lights, and turn signal lights.

In embodiments where the at least one indicator comprises at least one light, the controller may be configured to cause the at least one light to provide a visual indication having a blinking pattern, for example. In embodiments where the at least one indicator comprises at least one multi-color light, the controller may be configured to cause the at least one multi-color light to provide a visual indication that changes color based upon location changes of the portable device, for example.

In accordance with another example embodiment, the at least one indicator may comprise at least one audible indicator, and the controller may be configured to cause the at least one audible indicator to provide an audible indication directed toward the predicted zone. In an example implementation, the portable device may comprise a smart phone, and the controller may be further configured to cause the at least one indicator to provide a failure indication responsive to a failure to register with the smart phone.

A related method may include transmitting wireless signals from a plurality of wireless transmitters carried by a vehicle, and at a controller carried by the vehicle, wirelessly communicating with a portable device moveable relative to the vehicle and configured to receive the wireless signals from the plurality of wireless transmitters, and determining a predicted zone the portable device is located in adjacent to the vehicle based upon the received wireless signals. The predicted zone may be one of a plurality of different zones adjacent the vehicle having respective vehicle functions associated therewith. The method may further include, at the controller, causing at least one indicator carried by the vehicle to provide an indication that the portable device has entered the predicted zone, and enabling the respective vehicle function associated with the predicted zone.

DETAILED DESCRIPTION

In accordance with an exemplary embodiment of the preset invention, there is provided a system and method for micro-locating and communicating with a portable vehicle control device.

Through use of localization, a portable vehicle control device, such as a smartphone, can have its location approximated or detected relative to a vehicle. This way, if a smartphone is detected inside a vehicle, the smartphone may be enabled to start the vehicle. In addition, if the smartphone is detected inside the vehicle and the smartphone is in the driver's seat, the smartphone's texting feature may be disabled. Further, if the smartphone is detected outside the vehicle near the vehicle's trunk, automatic opening of the trunk/liftgate may be facilitated.

Localization technology enables a smartphone's location to be accurately detected under one meter. In one example localization technology, a plurality of Bluetooth low energy (BLE) beacons may be positioned within a vehicle. These beacons are small transmitters whose signals can be detected by smartphones and tablets. To receive beacon transmissions, a software application is installed on the smartphone or tablet. The application uses the transmitted Bluetooth Low Energy (BLE) signal to estimate its proximity to a beacon. This enables the delivery of relevant content in the right physical space, at the right time.

Figure 1:
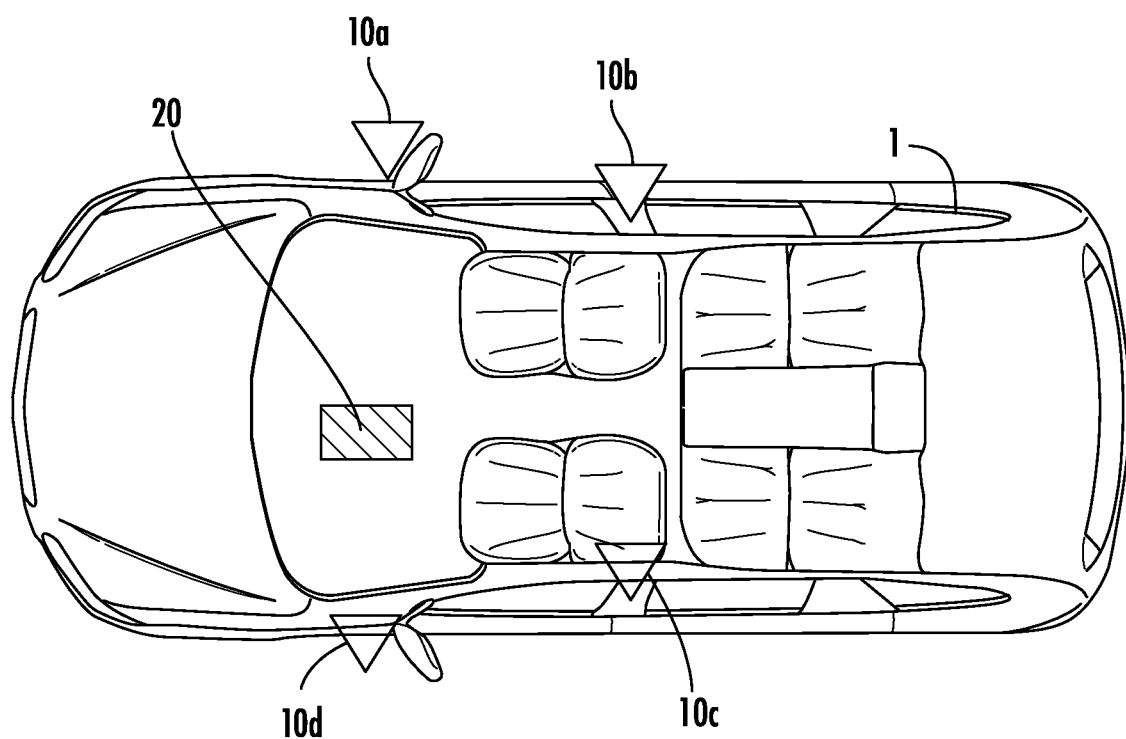
FIG. 1 is a schematic diagram of a system according to an exemplary embodiment of the present invention.
Figure 1:
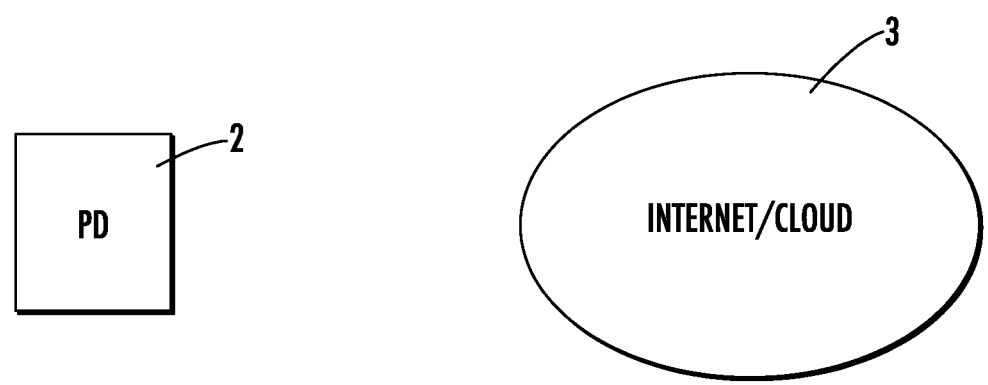

FIG. 1 illustrates a system according to an exemplary embodiment in which BLE localization is used to locate and communicate with a portable device. It is to be understood, however, that other localization technologies may be used such as WiFi, Quick Response (QR) codes, Zigbee, Ultra-Wideband (UWB), and ANT (ANT is a proprietary open access multicast wireless sensor network technology). It is to be further understood that BLE localization and UWB can be used with a number of mobile operating systems including Android and iOS.

Referring now to FIG. 1, there is shown a vehicle control system that includes a vehicle 1, a portable device 2 and internet 3.

The portable device 2 may be a smartphone capable of running one or more smartphone applications, and being carried by a user. The portable device 2 may include a control unit and one or more transceivers capable of wireless communication, including, for example, a BLE transceiver and a cellular transceiver. It should be understood that the portable device 2 is not limited to a smartphone, and that the portable device 2 may be any type of device carried by a user and separable from a vehicle, including, for example, a tablet or a key fob.

The portable device 2 may communicate with the internet 3 via its cellular transceiver. A variety of mobile telecommunication protocols may be employed by the portable device 2. These may include Global System for Mobile Communications (GSM) and Code Division Multiple Access (CDMA).

The vehicle 1 may include a plurality of BLE proximity sensors 10a to 10d and a BLE control module 20. The BLE proximity sensors 10a to 10d may be "Bluetooth beacons." A Bluetooth beacon is a transmitter that uses BLE to broadcast a signal that can be heard by compatible or smart devices. These transmitters can be powered by batteries or a fixed power source such as a Universal Serial Bus (USB) adapter. When a smart device is in a beacon's proximity, the beacon will automatically recognize the smart device and will interact with the smart device.

For example, as shown in FIG. 1, the BLE proximity sensors 10a to 10d are capable of transmitting signals to one or more transceivers of the portable device 2. For example, the BLE proximity sensors 10a to 10d may be configured to transmit signals to a BLE transceiver of the portable device 2. As described herein, based on the communication signal from the one or more of the BLE proximity sensors 10a to 10d, the portable device 2 may determine location information about itself.

The BLE proximity sensors 10a to 10d can further communicate with each other. As an example, they may exchange security data indicating they are part of the same system and authorized to communicate with other system components. In yet another example, they may communicate signal strength coming from the portable device 2 as well as a time stamp of the signal coming from the portable device 2.

The BLE control module 20 may communicate with the BLE proximity sensors 10a to 10d. This communication may be via a wired or wireless interface. For example, the BLE control module 20 and the BLE proximity sensors 10a to 10d may communicate over a vehicle bus such as a Controller Area Network (CAN) bus. The BLE control module 20 may communicate with a vehicle control system via the vehicle bus. For example, in response to the portable device 2, the BLE control module 20 may instruct the vehicle system to lock or unlock a door of the vehicle 1.

The BLE control module 20 can communicate with the BLE proximity sensors 10a to 10d to control behavioral patterns and/or operating modes thereof. As an example, the BLE control module 20 can instruct the BLE proximity sensors 10a to 10d to operate, for how long to operate, at which frequency to operate, etc. In yet another example, the BLE control module 20 can instruct the BLE proximity sensors 10a to 10d when to power up, when to power down or when to run according to a schedule.

The BLE proximity sensors 10a to 10d may be disposed at various locations on the vehicle 1. Example locations include rearview exterior mirrors, and upper and/or lower portions of the doors, the rear bumper or a combination thereof. As shown in FIG. 1, the BLE control module 20 is disposed in the vehicle dash, two BLE proximity sensors 10a and 10d are disposed in the rearview exterior mirrors and two BLE proximity sensors 10b and 10c are disposed at mid-portions of the passenger and driver side doors. It should be understood, however, that the embodiments described herein are not limited to this configuration, and that the BLE control module 20 and the BLE proximity sensors 10a to 10d may be disposed anywhere in the vehicle 1.

Figure 2:
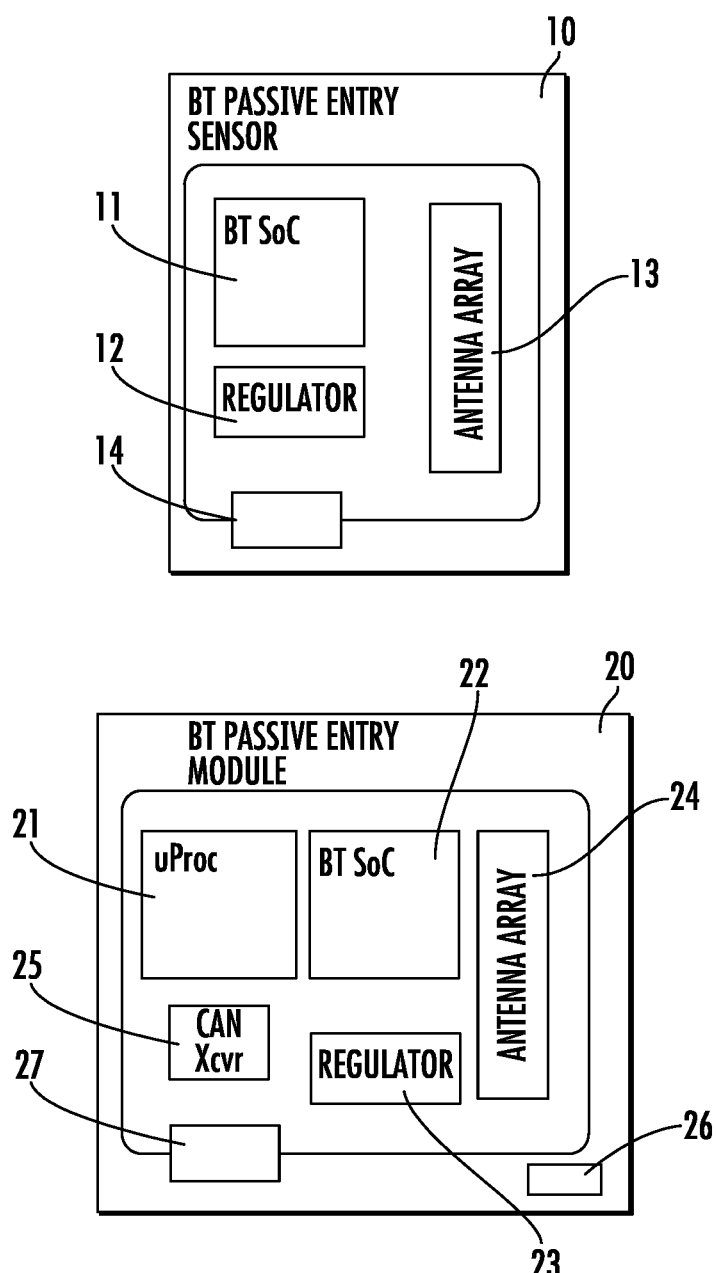
FIG. 2 is a schematic diagram of a Bluetooth passive entry sensor and a Bluetooth passive entry module included in the system of FIG. 1 according to an exemplary embodiment of the present invention.

FIG. 2 illustrates a BLE proximity sensor 10 (BT Passive Entry Sensor) and a BLE control module 20 (BT Passive Entry Module) in more detail. As shown in FIG. 2, the BLE proximity sensor 10 includes a BT system-on-chip 11, a voltage regulator 12, antenna array 13 and a connector 14. The BLE control module 20 includes a microprocessor 21, a BT system-on-chip 22, a voltage regulator 23, antenna array 24, a CAN transceiver 25, a general-purpose input/output (GPIO) 26 and a connector 27.

The BT system-on-chip 11 of the BLE proximity sensor 10 enables BLE master and slave nodes to be built and includes a radio frequency (RF) transceiver with a software integrated development environment, in-system programmable flash memory and other peripherals to interface with a wide range of sensors, etc. The connecter 14 of the BLE proximity sensor 10 may be used to connect the BLE proximity sensor 10 to the vehicle's power supply.

The BT system-on-chip 22 of the BLE control module 20 may operate similar to the BT system-on-chip 11 of the BLE proximity sensor 10. The connecter 27 of the BLE control module 20 may be used to connect the BLE control module 20 to the vehicle's power supply. The GPIO 26 of the BLE control module 20 may be used to hardwire the BLE control module 20 to the vehicle's electrical system. The CAN transceiver 25 of the BLE control module 20 allows the microprocessor 21 of the BLE control module 20 to communicate with the vehicle's electrical system through a CAN bus.

Referring now to FIGS. 1 and 2, in an exemplary embodiment the BLE control module 20 may use its antenna array 24 to communicate with the BLE transceiver of the portable device 2. The antenna array 24 may be a directional or omnidirectional antenna. The BLE control module 20 may establish a BLE connection between itself and the portable device 2, thereby allowing the portable device 2 to communicate with the BLE control module 20 when in proximity to the vehicle 1. Such communication will be authorized once the portable device 2 is authenticated by the BLE control module 20.

The BLE proximity sensor 10c may use its antenna array 13, such as a directional antenna aimed tower the driver seat, to determine where the portable device 2 is located. For example, if the portable device 2 is located outside the vehicle 1, the signal strength between BLE proximity sensor 10c and the portable device 2 may be low. If the portable device 2 is located in the rear seat of the vehicle 1, the signal strength between the BLE proximity sensor 10c and the portable device 2 may be low. If the portable device 2 is located in the driver seat, the signal strength between the BLE proximity sensor 10c and the portable device 2 may be high. Based on the signal strength, the portable device 2 may be able to determine its location, such as whether or not it is in or near the driver seat.

For enhanced accuracy, each of the BLE proximity sensors 10a to 10d may transmit a signal to the portable device 2. Based on a combination of the strength of these signals, the portable device 2 may determine precise location information about itself. For example, if the signals received from the BLE proximity sensors 10 disposed outside the vehicle 1 are weaker than the signals received from the BLE proximity sensors 10 disposed outside the vehicle 1, the portable device 2 may know it is inside the vehicle 1. Further, if the signal received from a BLE proximity sensor 10 disposed in the driver side door is stronger than the signals received from the BLE proximity sensors 10 disposed in the front passenger and rear passenger doors, the portable device 2 may know it is in the driver seat.

Each of the BLE proximity sensors 10a to 10d may transmit a Bluetooth discovery signal and/or a received signal strength indicator (RSSI) signal to the portable device 2. These signals may be repeatedly transmitted.

A control unit of the portable device 2 may monitor the signal strength (RSSI data) received from each of the BLE proximity sensors 10a to 10d. Based on the monitored signal strength, the control unit determines if the portable device 2 is located in close proximity to the vehicle 1 for unlocking or within the front part of the vehicle 1 for starting the vehicle 1. It should be understood that the portable device 2 may determine its location in a variety of ways.

For example, the control unit of the portable device 2 may determine the location of the portable device 2 based on whether the signal strength of the BLE proximity sensors 10a to 10d exceeds a threshold. For example, if the signal strength of the BLE proximity sensor 10a is above the threshold, the portable device 2 may know it is near the BLE proximity sensor 10a. Further, if the signal strength of the BLE proximity sensor 10b is below the threshold and the signal strength of the BLE proximity sensor 10a is above the threshold, the control unit may know with more accuracy that the portable device 2 is located near the BLE proximity sensor 10*a*. The strengths of the signal received from the BLE proximity sensors 10*a* to 10*d* may be sent to the BLE control module 20.

The BLE control module 20 may include a software algorithm stored on its memory and operable using its microprocessor 21 to enable the BLE control module 20 to know where the portable device 2 is based on signals received from the portable device 2. For example, based on the signal strength of a communication received from the portable device 2, the BLE control module 20 may know if the portable device 2 is inside the vehicle 1 or outside the vehicle 2. The algorithm may also know the current state of a variety of vehicle features. For example, whether the vehicle's doors are locked or unlocked. In this case, if someone in possession of the portable device 2 is within a predetermined range of the vehicle 1 and this information is provided to the BLE control module 20, the currently locked doors may be automatically unlocked. If someone in possession of the portable device 2 is outside another predetermined range of the vehicle 1 and this information is provided to the BLE control module 20, the currently unlocked doors may be automatically locked. In other words, passive entry features may be accomplished.

It is to be understood that when a door is automatically unlocked, in some cases, the door may be opened without the vehicle owner having to make physical contact with the door. For example, the door may seamlessly open as the vehicle owner crosses a predetermined distance threshold with respect to the vehicle. It is to be further understood that the door may not be fully opened, just partially opened, so that the door does not touch a vehicle parked nearby.

For example, when a person with the portable device 2 is more than 30 feet from the vehicle 1, the vehicle's doors may be locked. When the person with the portable device 2 is within 10 feet from the vehicle 1, the vehicle's doors may be unlocked. The distances used for locking and unlocking the vehicle's doors may be based on a threshold of signal strength and may incorporate a time delay.

For example, a radio frequency integrated circuit included in the portable device 2 reports an RSSI that can be used for understanding absolute power levels of a received transmission (or noise). The RSSI can be used to approximate a distance between the transmitter and the receiver with several assumptions such as the transmitter power and antenna gains. The distances assume a certain path loss based on distance and interference or attenuating factors. A large number of variables can change path loss in real time; thus, RSSI is used as a rough indicator when one receiver and one transmitter are used. In other words, RSSI is used to judge a distance between two devices.

In accordance with an exemplary embodiment hysteresis of the RSSI signal can be used to prevent the system from locking and unlocking multiple times as a user approaches a trigger threshold. For example, a single trigger threshold may be crossed with almost no motion of the user due to variation in signal strength just above or below the threshold. To prevent this, the hysteresis may be set with a reasonably large gap so that once transition from lock to unlock has occurred (as an example), a much smaller signal threshold may be set to transition again from unlock to lock. The smaller signal may represent a farther distance. In addition, a wait time may be set after the first threshold transition before checking the signal again. Further, a wait time may be set after the second threshold transition.

Figure 3:
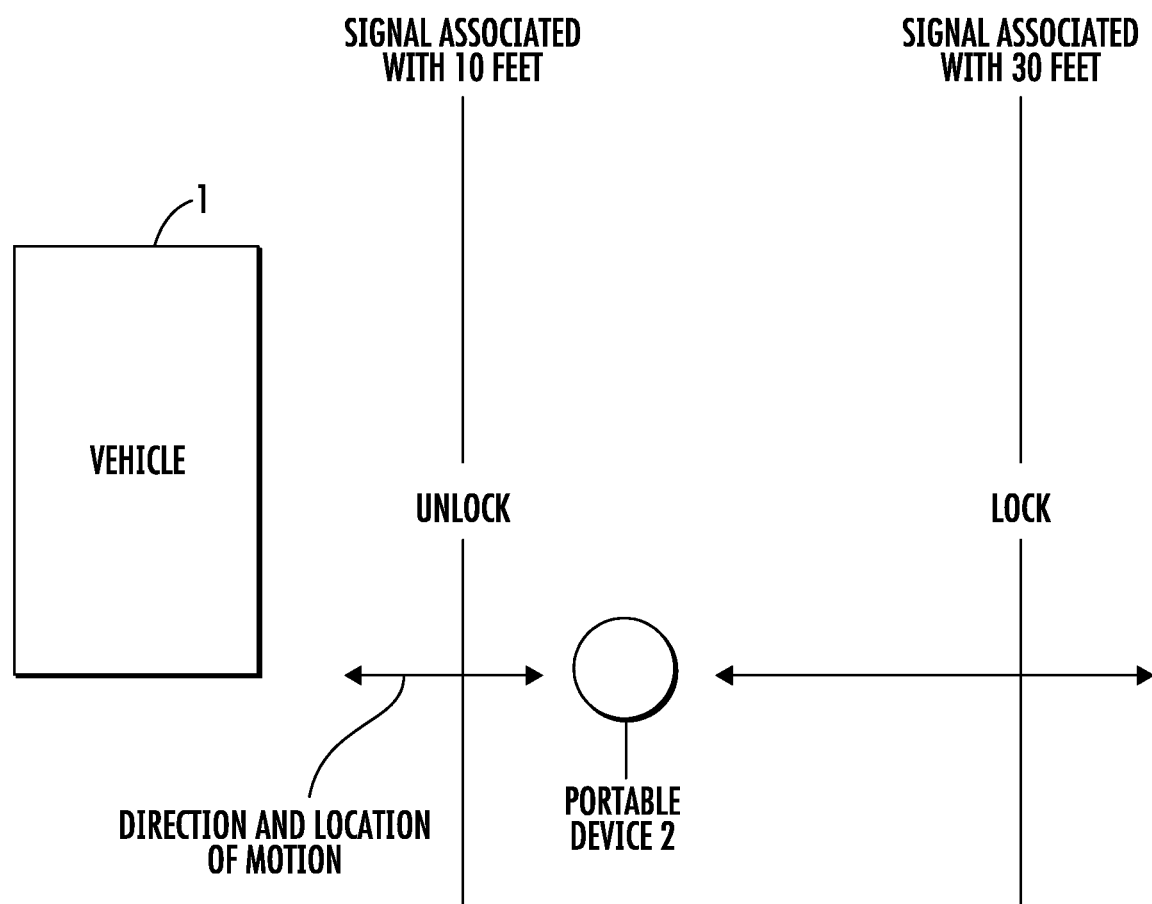
FIG. 3 is a schematic diagram illustrating using hysteresis of a received signal strength indicator (RSSI) signal to prevent vehicle doors from locking and unlocking multiple times as a user approaches a threshold according to an exemplary embodiment of the present invention.

For example, as shown in FIG. 3, the system of the vehicle 1 will unlock when the user (e.g., portable device 2) approaches and reaches an inner threshold (e.g., ~10 ft.). The system will not re-lock unless an outer threshold (e.g., ~30 ft.) is exceeded and the user stays past the outer threshold for a period of time (e.g., 3-5 sec).

In an exemplary embodiment the portable device 2 can have certain features disabled through use of localization. For example, when the portable device 2 is a smartphone, its texting feature can be disabled. For example, when the smartphone is detected through localization as being in the driver's seat, the phone's texting feature may be disabled. It is to be understood that other phone features can be disabled. For example, videotelephony technologies such as facetime may be disabled. It is to be further understood that phone feature disabling is not limited to the driver seat and be can adjusted to include phones present in the front row of a car or anywhere else in a car.

To accomplish this, an app running on the smartphone will communicate RSSI levels between the BLE proximity sensors 10 and calculate its location compared to a frame (either a centroid or node). This information can be compared to established thresholds referenced by the frame to establish zones to allow or disallow mobile device functions such as texting.

Figure 4:
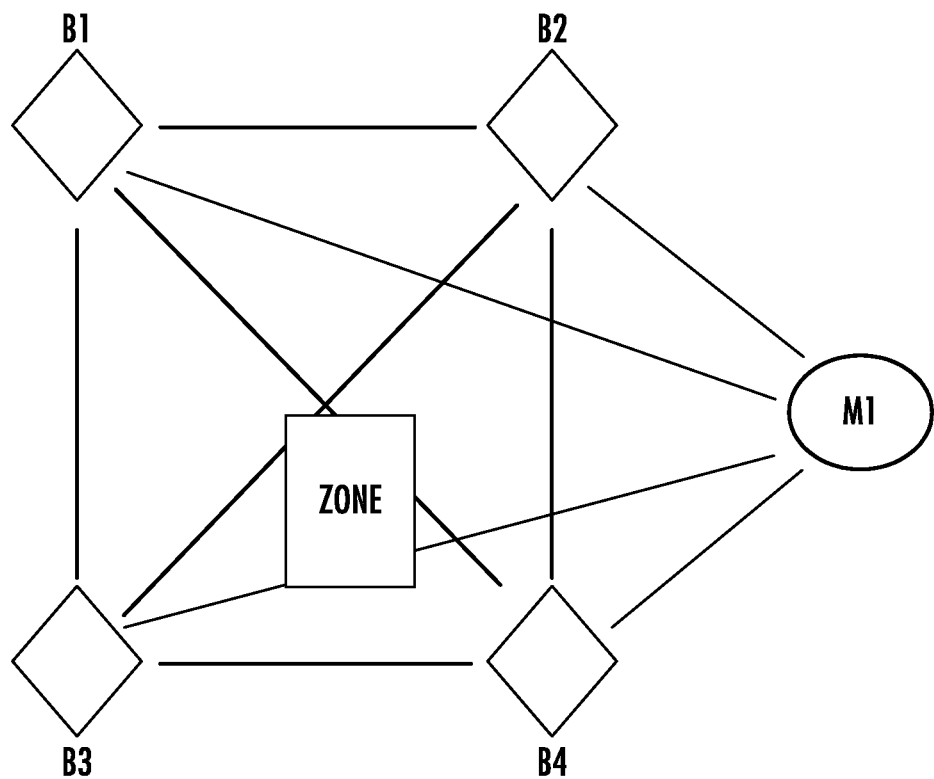
FIG. 4 is a schematic diagram illustrating locating by checking RSSI against all devices in a cycle according to an exemplary embodiment of the present invention.

For example, as shown in FIG. 4, localization can be achieved by checking RSSI against all devices in a cycle. B1 to B4 represent beacons in a vehicle and M1 represents a mobile device. Dark lines between the beacons B1 to B4 represent a beacon frame. A frame is established when the beacons B1 to B4 are communicably coupled to each other to form a network. In this case, the dark lines between the beacons B1 to B4 represent a communication channel between the beacons B1 to B4. To accomplish this, the beacons B1 to B4 establish signal strengths between neighbors. This way, variations within the frame can be detected.

Using the communicably coupled beacons B1 to B4, a zone Zone can be established. The zone Zone is threshold based. For example, the edges of the zone Zone can be defined by RSSI values with respect to the beacons B1 to B4. For example, the lower edge of the zone Zone would have strong RSSI values with B4 and B3, while have weak RSSI values with B1 and B2. The upper edge of the zone Zone would also have strong RSSI values with B4 and B2, but these values would not be as strong as the RSSI values of the lower edge of the zone Zone. More than one zone can be created.

When the mobile device M1 is brought into the frame, it can be determined whether the mobile device M1 is within the zone Zone. For example, signal strength between the mobile device M1 and each of the beacons B1 to B4 can be measured. The mobile device M1 can then be located against a centroid of the frame using triangulation techniques. The mobile device's location can then be checked against the boundaries of the zone Zone. If in the zone Zone, the mobile device M1 can be permitted full functionality (yes text) or limited functionality (no text).

It is to be understood that zones can also be established by estimation using reference mobile devices at the time of system design and placed into software as a set of calibrations. Zones can also be established by a training process at the time the mobile device is programmed (paired) to the beacon frame. Training can be a refinement of pre-established zones.

In an exemplary embodiment localization may be used to facilitate Bluetooth pairing to a vehicle's infotainment system. For example, when a smartphone is in close proximity to an infotainment display in a vehicle, the Bluetooth pairing process is initiated between these two devices. This way, the smartphone can control the infotainment system without having to perform a cumbersome pairing process with the entire vehicle control system. To accomplish this, a zone can be established near the vehicle's radio to indicate a function button is to be pressed to accept a pairing request (as an example).

In an exemplary embodiment localization can also be used to determine whether a person is standing at the back of the vehicle to facilitate automatic opening of the trunk/liftgate. In this case, a zone would be located near the rear of the vehicle.

In an exemplary embodiment, a coin cell battery powered back-up wallet card that allows a user to access the vehicle if the smartphone is lost/stolen/dead battery can be provided. The wallet card would still allow the user to unlock and start the vehicle. In this case, the mobile device is replaced by a hardware device such as a key fob or wallet card that contains a BT radio, micro-controller and firmware that operates like the app described above.

In an exemplary embodiment Bluetooth tire pressure monitor sensors (TPMS) paired to a vehicle that also add security protection to wheels may be provided. For example, if wheels are removed while the security system is armed, then the alarm will be triggered.

For example, the wheel sensors may be configured to act as part of the beacon frame (the frame does not have to be made by four BT devices). In this case, an alert or alarm trigger can be set if one of the beacons stops functioning or drops out of the network. The beacons may also be defined by type and alert levels can be set based on type. For example, some types may cause an alarm trigger, while others may not. Further, alerts may be of different forms such as a text message.

In addition, rather than defining the wheel sensors as part of the beacon frame, the sensors can be defined as additional devices. For example, a smartphone may be defined as a first mobile device, a dongle/key fob may be defined as a second mobile device and the tire sensors may be defined as a third mobile device. The tire sensors may include their own microprocessor, BT transceiver, power, etc. and they may be put inside a tire. For example, the tire sensors may be in a lug nut cap or a tire stem.

In an exemplary embodiment all radio frequency (RF) in the car can be Bluetooth (BT) instead of Ultra-High Frequency (UHF).

In an exemplary embodiment urban mobility features for zipcar and car sharing services are provided. For example, there may be provided a process to share encryption keys to enable car start and unlock based on account credentials managed in a cloud database—pay per use or credit card account, etc. Current systems require a BT connection between the phone and the vehicle. BT connections require the devices be paired before data can flow. In present exemplary embodiment, an app is used to get authorization to pair with the vehicle prior to initiating pair or it will block access. Additionally the pairing process can be simplified and be accessible when the vehicle is off and the user is outside the vehicle. In this case, an NFC antenna can be mounted on the inside of a window surface that will active the BT pairing process and share pairing data via the Near Field Communication (NFC) channel. In another case, the vehicle can have a telematics module that is in communication with the cloud service along with the phone. The BT pairing data will flow between the vehicle and phone via the internet on a secure channel brokered by the cloud service.

To enable vehicle access via BT, an exemplary authorization process is as follows:
1. The service provider preprograms a unique vehicle access key for each vehicle before end user check out. Each vehicle will have one or more identifier constant(s): UUID, Bluetooth Address, and VIN. Each record in the cloud database will include the aforementioned identifier constants as well as the preprogrammed vehicle access key. This record data is referred to as vehicle access information.
2. Via mobile app, the end user checks out a vehicle after payment. The mobile app will access the cloud service to download and store vehicle access information used for BT link pairing via SSP (Secure Simple Pairing).
3. If a vehicle is unpaired, it will be advertise the vehicle identifier(s) and wait for connections on a schedule. The mobile app will attempt pairing when the end user attempts to access the vehicle.
4. If a vehicle is already paired, it will connect to the mobile device if within BT range.
5. Once paired, the end user has full access to the feature set.
6. During vehicle check in, the BT link is unpaired and the vehicle access key is removed from the mobile app. The service provider then connects to the vehicle in order to create a new vehicle access key and remove any end user Bluetooth pairing profiles.

In an exemplary embodiment there is provided a low current BT pinging scheme. For example, polling may be put on a schedule, a ping schedule may be based on last access to the vehicle, and adaptive scheduling may be based on location, time of day (e.g., google staking—going to work, coming home from work, shopping). For example, BT beacons advertise on a schedule every 5-10 seconds. The schedule can be made longer or shorter. For example, between 6 am car is frequently used, therefore, up the ping rate.

In an exemplary embodiment there is provided a link to a biometric (e.g., iris recognition, fingerprint, facial/voice recognition, etc.) which adds security for authentication to start a vehicle, authentication to share a vehicle, or login. In this case, through use of biometric identification, only certain people can pair a phone, allow a car to start if a phone battery is dead or a phone won't authenticate for some reason. Biometric identification can also be used for personalized feature controls like memory seat, radio preset, mirror location, teenage restrictions—speed limit, radio volume, geofence zone settings/alerts, for example. In addition, biometric identification can be used for True Driver ID for insurance & Customer Relationship Management (CRM) services, as well as providing features such as tracking and speed alerts—sent through the phone data channel, drowsiness detection and alerts, under-the-influence detection. For example, teen driving over 70 mph, text sent to parent's phone.

In an exemplary embodiment eye dilation reaction time is delayed when a person is under the influence of alcohol. Using internal eyelock system in rear view mirror, eyelock can do under the influence detection method (e.g., detect rate of eye dilation) using flashing light in mirror to cause pupil to dilate. When rate dilation exceeds an under the influence threshold, the car may be prevented from being started.

In an exemplary embodiment there is provided a link to an RF—the RF keypad being used for entry to the vehicle if a phone is dead or lost. In this case, an externally mounted RF keypad can be used to gain entry to the vehicle when a cell phone battery is dead. This allows a user to charge the phone once in the vehicle to allow car start through cell phone authentication. In addition, access to a car can be permitted and authenticated using eyelock, fingerprint, or another biometric. Further, a thin wallet card with BT chip and battery can be used. This would be used as a spare key to enable vehicle unlock and start in case of dead cell phone battery. A power switch can be used to enable circuitry only when needed to preserve coin cell life (this feature could extend the useful life of a back up dongle or wallet card to near 10 years). NFC can be embedded in the RF keypad to allow for unlock.

In an exemplary embodiment there is provided a link to NFC for initial pairing, using encryption to start and credential sharing. For example, NFC is a secure communication channel that typically requires very low range such a 4 cm or less to couple the signal. In the present embodiment, an NFC antenna can be placed in the vehicle dashboard or nearby and require the phone be placed on the coupling surface to enable it to be used as a secure key. Encryption keys and security data can be communicated via the NFC channel. Certain credential updates such as deactivation or ownership transfer can also be limited to occur only through this process. NFC can be used to initiate BT pairing as opposed to advertising and discovery. This can save power.

In an exemplary embodiment a network mesh using the ANT protocol (although other approaches may also be used such as Bluetooth Mesh, etc.) and involving command signal hopping from vehicle to vehicle as well as data hopping from vehicle to vehicle is provided. In this case, a command signal (lock, remote start, etc.) is tagged with a vehicle address and any vehicle with this equipment will receive the signal and rebroadcast to all other nodes in the mesh within range—the signal would continue to hop until the receiving device finally gets the signal. The signal may be prevented from recirculating and may have an expire—the expire can be a hope count or time limit or both.

In an exemplary embodiment an RF/BLE fob may be yet another peripheral which gives a phone access to controlling remote functions (start, locate, security, etc.) by providing a BT or RE gateway to the vehicle's (RSM).

In an exemplary embodiment if you want to borrow a friend's car, a web service can have a secret key allowing you to borrow the key for two days, for example. The encryption keys are in the cloud. They are sent to your phone assuming you are a member of the web service. The time permitted to use the secret key can be extended. Further, when sharing credentials, functionality can be limited. For example, speed can be limited, trunk access can be denied.

In accordance with an exemplary embodiment by holding phone near radio and turning on BT pairing of the radio, since the phone knows where it is (due to localization), the phone will be paired to the radio.

In accordance with an exemplary embodiment there is provided a safety feature to disable the text function on a paired phone when the system determines said phone is in location of the driver seat. For example, if same phone is being held by and located in a passenger seat texting is enabled, as soon as it is moved into the driver seat location, texting is disabled. The safety feature can be activated/deactivated when in dealer lot mode.

In accordance with an exemplary embodiment, a smart phone can be utilized instead of or in addition to ACM keypad for preload vehicle security access. This eliminates the need for dealers to purchase ACM keypads and can reduce program costs.

In operation:
Dealer web browser acts as an administration tool to set up users/smart phones and view/print usage reports
Smart phones are used at time of install, during sales demos in lot-mode, and to transition the security product to consumer mode
Smart phones control the vehicle security & RKE systems and transmit the usage activity to the server Smart phone/users are given access rights by the administrator (time of day and days of week operation) All usage transactions are sent to the server
Vehicle ID
Smart phone ID (user)
Operation type (lock, unlock, consumer mode transition, transition type (Red, Green, Yellow, Blue)
Timestamp
The use process is as follows:
User opens smartphone app
App checks with server to verify user access and logs in
User come within range of vehicle to gain access
  Possible usage methods to control vehicle
    Scan VIN barcode, or barcode sticker
    Hold phone to NFC tag (if system configured and equipped)
    User presses number sequence keyed to the vehicle 1D
    Select vehicle from menu list (list populated by all vehicles within Bluetooth range)
User presses function key
  Lock/unlock/transition
Transaction information is sent via cell network to the sever to create transaction record In accordance with an exemplary embodiment the aforementioned localization techniques can be used to set up driver preferences like memory seat, radio presets, climate controls, mirror locations, etc.

In accordance with an exemplary embodiment when the phone is detected in the driver seat area, certain phone features such as Siri and Google voice can be automatically engaged.

In accordance with an exemplary embodiment the localization algorithm can have multiple hysteresis thresholds depending on location and mode of operation. For example, the algorithm can determine instantaneous location changes within the beacon frame, but actions and feature actuation can have different hysteresis criteria—these criteria would be based on reaction to total distance moved into and out of function zones and also time in and out of the zone as well as rates of movement. Use of the phone's accelerometer may be used in both the feature activation functions and in the location algorithm. As an example, the driver may simply extend their arm (holding phone) to try to defeat the zone texting lockout. This would happen quickly and for a relatively short duration. There can also be an activation feature based on location and motion of the phone such as shake twice to activate Siri if in the driver zone, etc. Or, shake twice to lock the car when around the vehicle after exiting the car.

Figure 5:
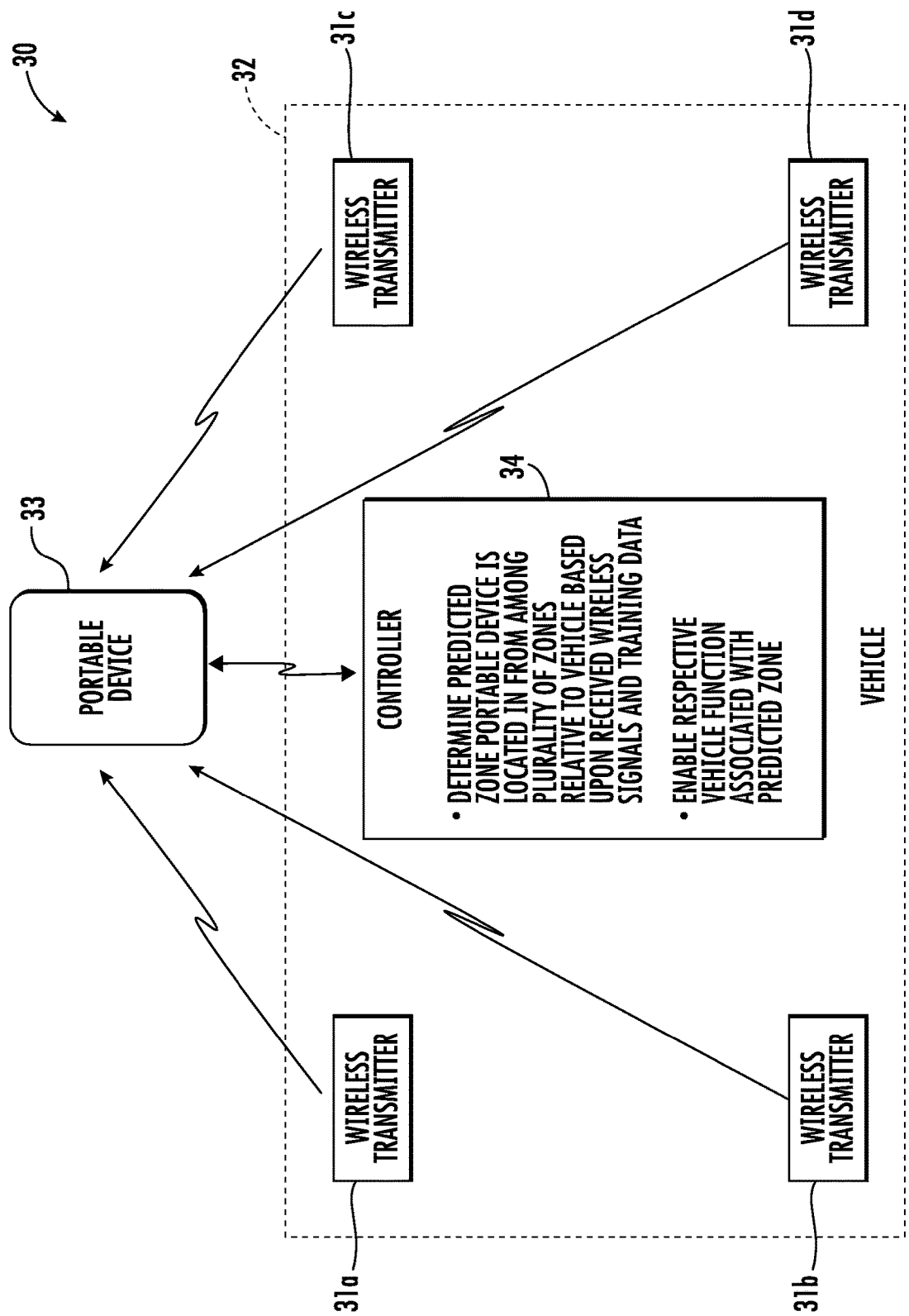
FIG. 5 is a schematic block diagram of a vehicle system in accordance with an example embodiment providing portable device zone location based upon training data.
Figure 6:
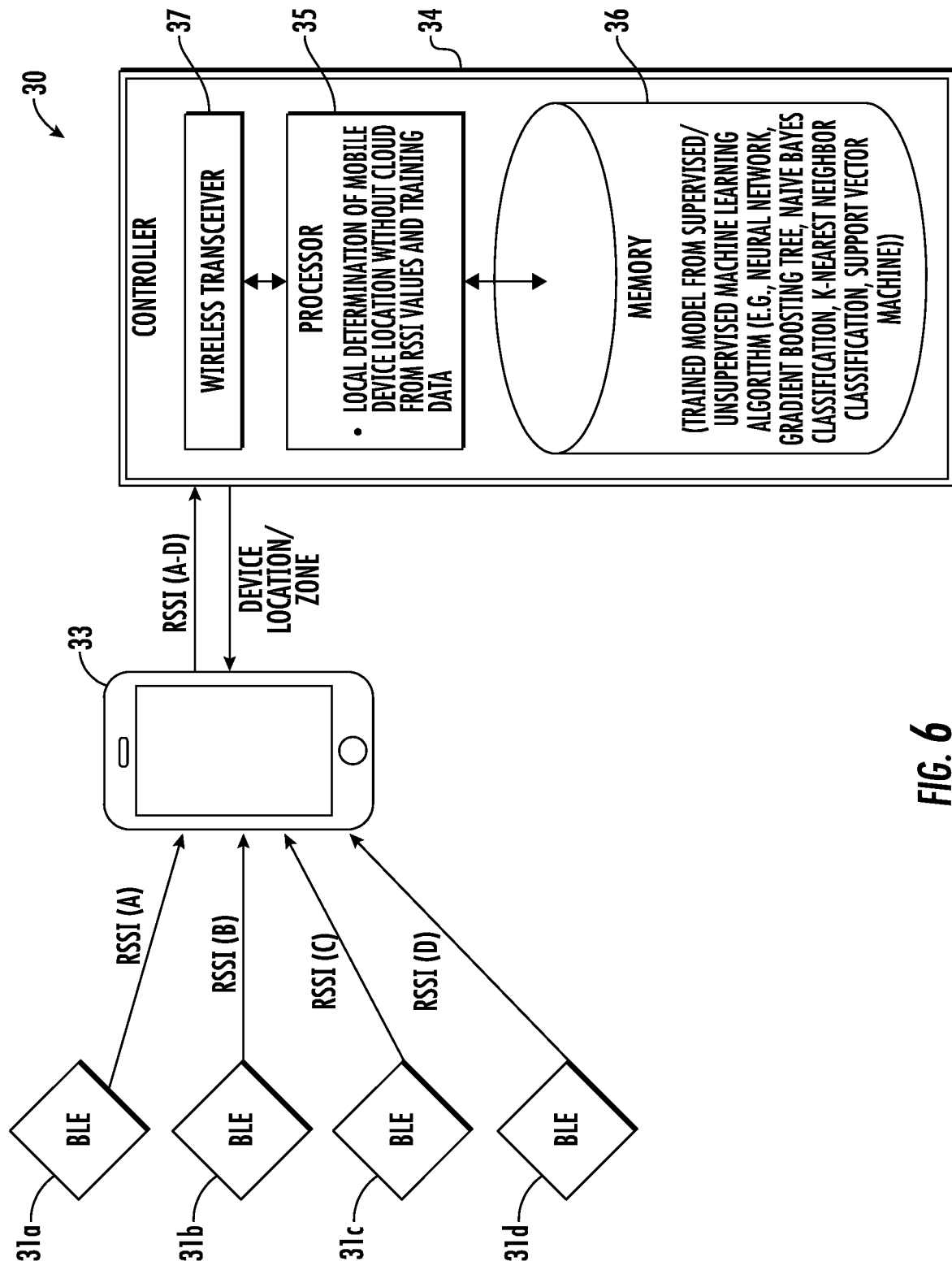
FIG. 6 is a schematic block diagram of the vehicle system of FIG. 5 shown in greater detail in accordance with an example implementation.

Turning now to FIGS. 5-6, another example implementation of a vehicle system 30 illustratively includes a plurality of wireless transmitters 31a-31d that are carried by a vehicle 32 at spaced apart locations and are configured to transmit wireless signals. By way of example, the wireless transmitters 31a-31d may be BLE transmitters as discussed further above and as illustrated in FIG. 6, but here again other types of wireless communication formats (e.g., UWB, WiFi, Zigbee, etc.) may be used in different embodiments. Furthermore, while there are four wireless transmitters 31a-

31d shown in the illustrated example, it will be appreciated that other numbers of transmitters may be used in different embodiments as well.

The system 30 further illustratively includes a portable device 33, which as discussed above may be a cellular phone/smartphone (as shown in FIG. 6), a fob, or other types of portable electronic devices such as tablet computers, smart watches, etc. In any event, the portable device 33 is moveable relative to the vehicle 32 and is configured to receive the wireless signals from the wireless transmitters 31a-31d, as also discussed above.

A controller 34 is illustratively carried by the vehicle 32 and configured to wirelessly communicate with the portable device 33, determine a predicted zone the portable device is located in from among a plurality of zones relative to the vehicle 32 based upon the received wireless signals using the techniques described above, and further based upon training data. More particularly, each zone has at least one respective vehicle function associated therewith, and the controller 34 is also configured to enable the respective vehicle function associated with the predicted zone, as will be discussed further below.

Generally speaking, the system 30 uses training data in the form of a trained model generated from machine learning to make predictions on where an end user is (via the end users' portable device 33) about the vehicle 32. This may conceptually be considered as inference-based localization, deriving from the fact that inference is made by a machine learning algorithm, in which it is predicting where a user is around a vehicle (localization) based upon the user's portable device 33.

By way of example, the machine learning algorithm used to derive the training data may comprise one or more of a neural network, a gradient boosting tree, a naïve Bayes classification, a K-nearest neighbor classification, and a support vector machine. Moreover, the machine learning may be supervised or unsupervised machine learning. The controller 34 illustratively includes a processor 35 and associated memory 36 for storing the previously trained supervised machine learning model (FIG. 6). One advantage of using the trained model stored within the memory 36 locally at the controller 34 is that this advantageously allows the processor 35 to locally make location determinations without Cloud computing or other remote computing resources. This, in turn, may result in quicker location determinations because it avoids latency with respect to Cloud service communications, and may also avoid the cost associated with a separate wireless (e.g., cellular) service to the vehicle 32. The controller 34 further illustratively includes a wireless transceiver 37 (e.g., Bluetooth, etc.) coupled to the processor for wirelessly communicating with the portable device 33.

In the example illustrated in FIG. 6, the portable or mobile device 33 will tensor (group together) RSSI values RSSI (A)-RSSI(D) that are reported between itself and all of the BLE transmitters 31a-31d at a single instance, and send these to the controller 34. The controller 34 then predicts the location of the end user equipped with the mobile device 33 within a given zone around or in the vehicle 32, based off of the RSSI values RSSI(A)-RSSI(D) reported to it using the trained model. Once the location is predicted, this prediction is then sent back to the mobile device 33, and the process may repeat. In an example implementation, the RSSI values RSSI(A)-RSSI(D) are continuously reported between the mobile device 33 and the BLE transmitters 31a-31d, and an RSSI between the mobile device and the controller 34 is also reported. In some embodiments, the controller 34 may be connected to the transmitters 31a-31d at the vehicle (e.g., through a direct wired connection, databus, wirelessly, etc.) and selectively control their transmissions, such as to disable them when the portable device 33 is away from the vehicle 32 or enable them as the portable device approaches the vehicle, as will be discussed further below, which may be beneficial in terms of power savings, for example.

Referring additionally to FIGS. 7-12, example location scenarios by the controller 34 will now be discussed. As used herein, a "location" is considered a general zone in which the end user (i.e., the portable device 33) is present in. It may also be referred to as just a "zone" as well, and does not have to be interpreted as a numeric measurement (e.g., such as in terms of linear distance or unit of measure), but rather as a prediction of the general location of an end user. In the illustrated example, there are eight zones 70-77 recognized by the controller 34, but other numbers of zones may also be used in different embodiments. The defined zones includes: a driver side zone 70 on the driver's side of the vehicle 32; a passenger side zone 71 on the passenger's side of the vehicle; a front zone 72 at a front of the vehicle; a rear zone 73 at a rear/back of the vehicle; an inside zone 74 inside of the vehicle; and approach zone 75 surrounding the vehicle; an away zone 76 surrounding the vehicle and outside of the approach zone; and a hysteresis zone surrounding the vehicle and between the approach and away zones. It should be noted that in some embodiments the interior zone 74 may correspond to a subset of the vehicle interior (e.g., the driver's seat area), or be split into interior sub-zones (e.g., front/rear seats, driver/passenger side seats, etc.), if desired, for enabling different vehicle functions accordingly.

The away zone 76 is defined by whether the portable device 33 (which is a wireless key fob in the illustrated examples) has connected to the controller 34 or not, i.e., whether it is in wireless communication range. Mobile device 33 (and therefore the user) is in the away zone 76 if the mobile device makes a connection with the controller 34 during approach. A user is not in the away zone 76 if the mobile device 33 is disconnected from the controller 34, or it has passed into the next zone on approach, which in the present case is the hysteresis zone 77. There need not be a "hard-coded" distance threshold associated with the away zone 76, since the range of connection in different scenarios will be different (e.g., different types of portable devices may have different ranges, etc.). More particularly, the away zone 76 range may be variable and depend on environmental factors such as RF interference, proximity to walls, structures and other vehicles, mobile device placement (e.g., pocket, bag, etc.). Moreover, the zone location may become more uncertain with increasing distance from the vehicle 32.

Figure 7:
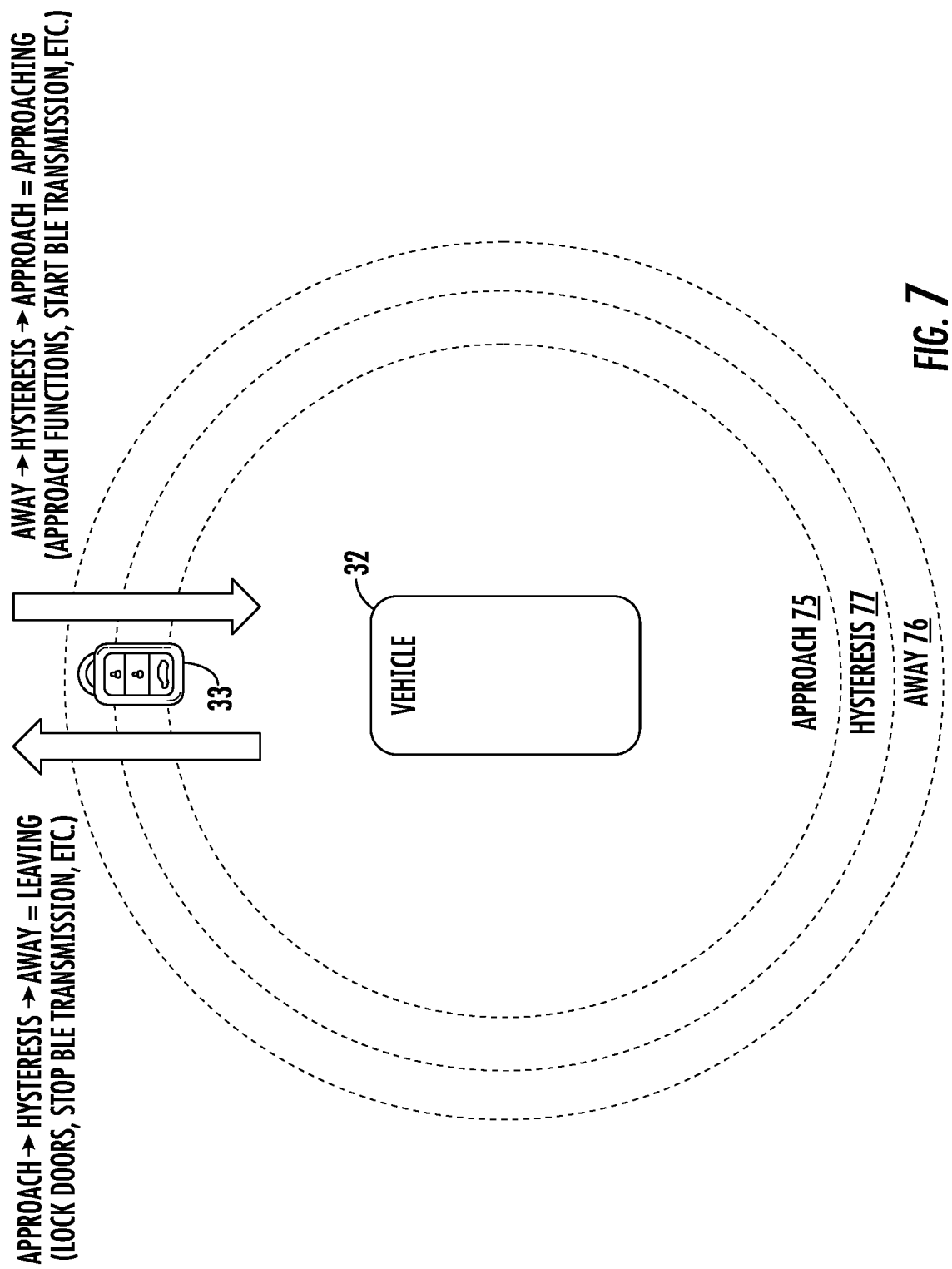
FIGS. 7-12 are schematic diagrams illustrating the location of a portable device within various zones around a vehicle by the system of FIG. 6.

The hysteresis zone 77 allows for a buffer-hysteresis for bridging the transition between the away zone 76 and the approach zone 75, and determining a direction the mobile device 33 is traveling. More particularly, a user is approaching the vehicle (approach threshold) if he or she is transitioning from the away zone 76 to the approach zone 75, and conversely a user is leaving the vehicle 32 (away threshold) if he or she is transitioning from the approach zone to the away zone, as shown in FIG. 7. The hysteresis zone 77 may incrementally bias towards one direction or the other based on a transition of zones (e.g., a state machine). This functionality may be used for determining direction of approach when desired, or where hard-coded thresholds are used internally. In other instances, the hysteresis zone 77 may just be treated as part of the away zone 76.

The approach zone 75 is a zone in which the user may be considered to be within a reasonably close distance to the vehicle 32 where the RSSI will continue to increase. A user is in the approach zone 75 if he or she has passed the hysteresis zone 77, or if the user is detected in one of the near vehicle zones 70-74. A user is not in the approach zone 75 if he has never connected (i.e., was never in the away zone 76), or has left the approach zone 75 transitioning into the away zone after passing the away threshold. Here again, this functionality may be used for determining the direction of approach if desired, or if hard-coded thresholds are used internally. Otherwise, the approach zone could be treated as part of the away zone 76.

Figure 8:
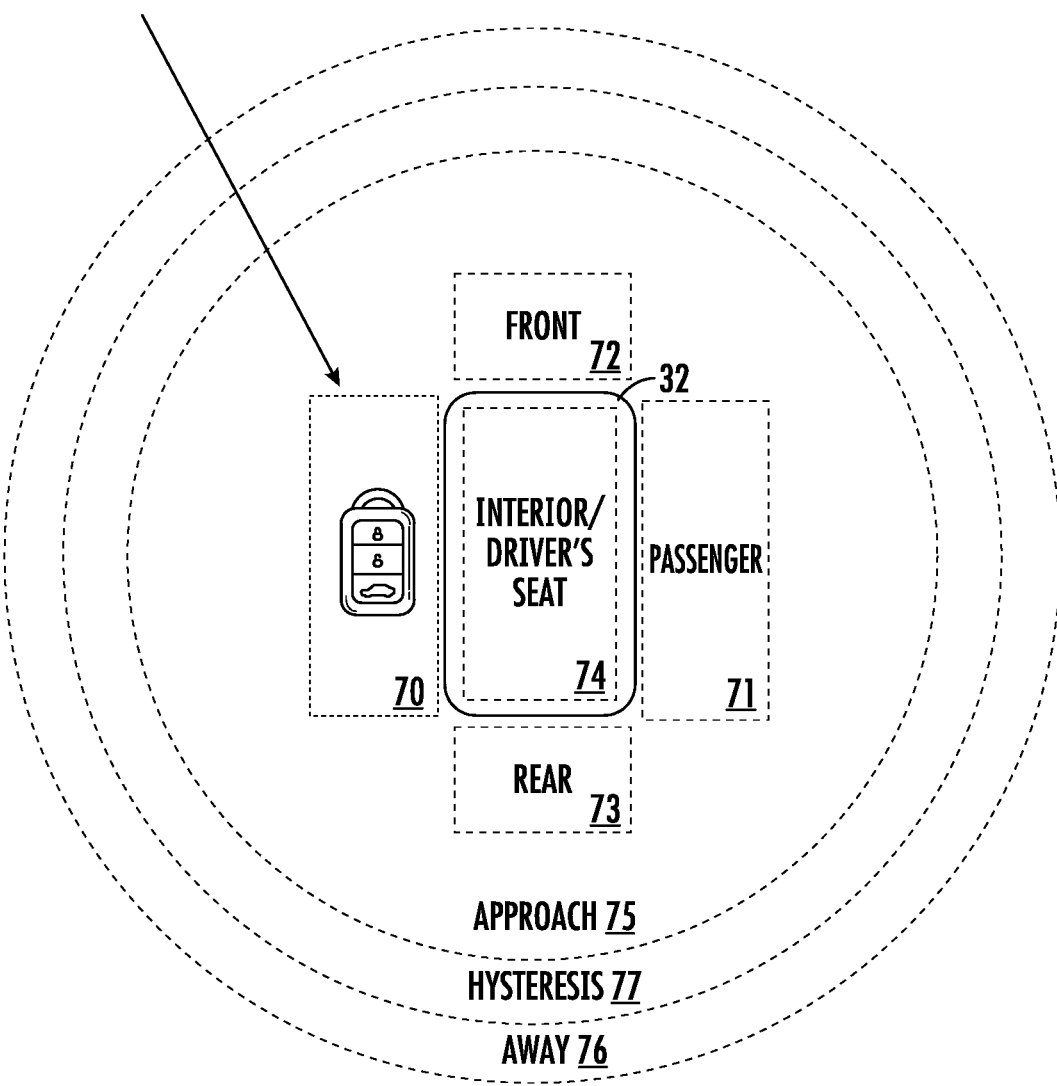

The near zones 70-74 are defined by smaller subsets of the approach zone 75 and represent different relevant locations around and in the vehicle 32. In the example of FIG. 8, the mobile device 33 is within the driver side zone 70, which is indicated by a dotted border (the other near zones 71-74 have dashed borders to indicate the portable device is not present therein), meaning that the user is on the driver's side of the vehicle 32. Vehicle functions that may be associated with the driver side zone may include unlocking the driver door (and optionally other doors), such as in response to a handle touch or simply by auto unlocking, etc. Other vehicle functions may include triggering approach lights (e.g., head lights) to "greet" a user when transitioning from the away zone 76 to one of the near zones 70-74, and the converse (i.e., transitioning from a near zone to the away zone) could trigger an auto-lock timer, for example.

Figure 9:
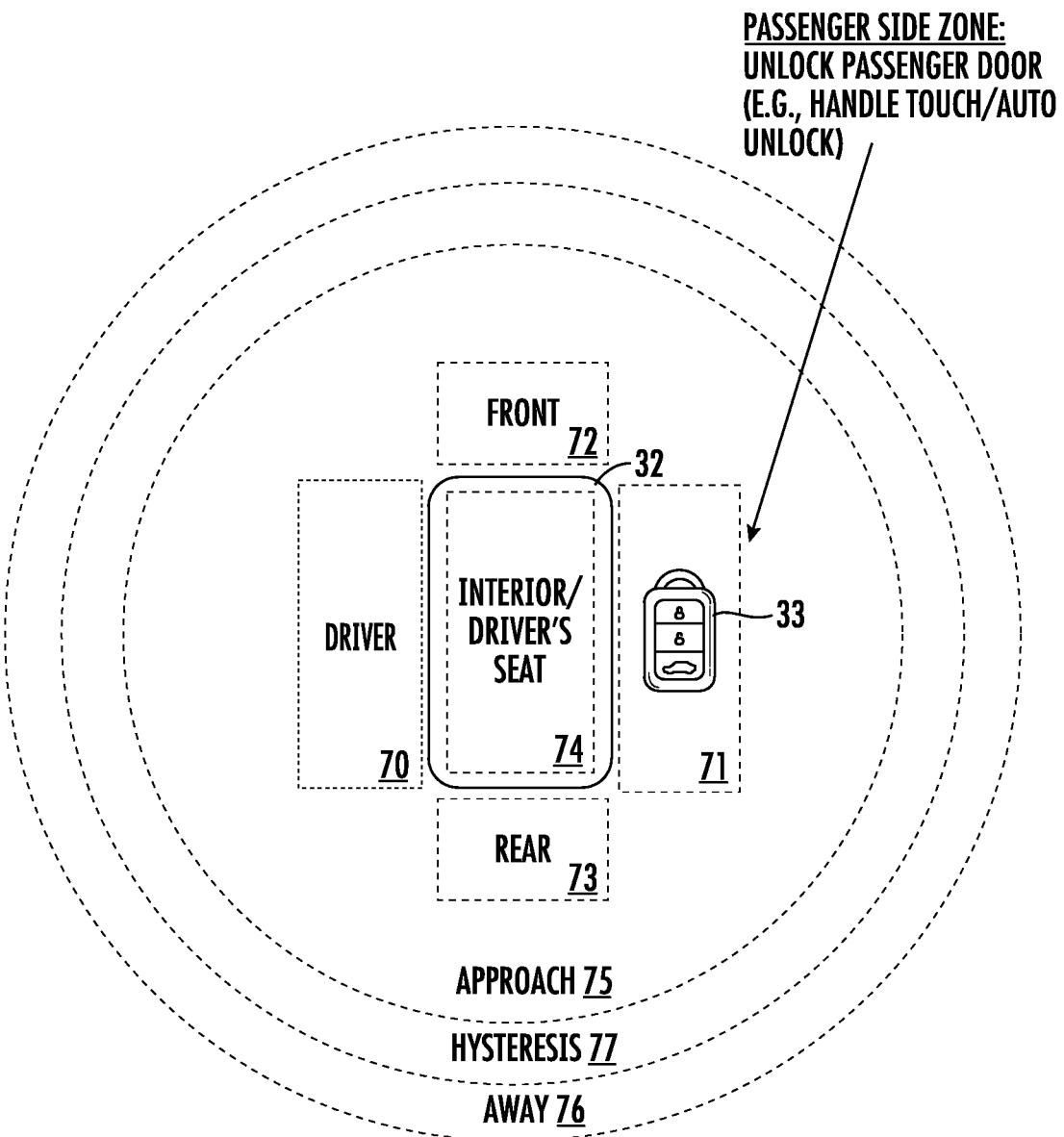
Figure 10:
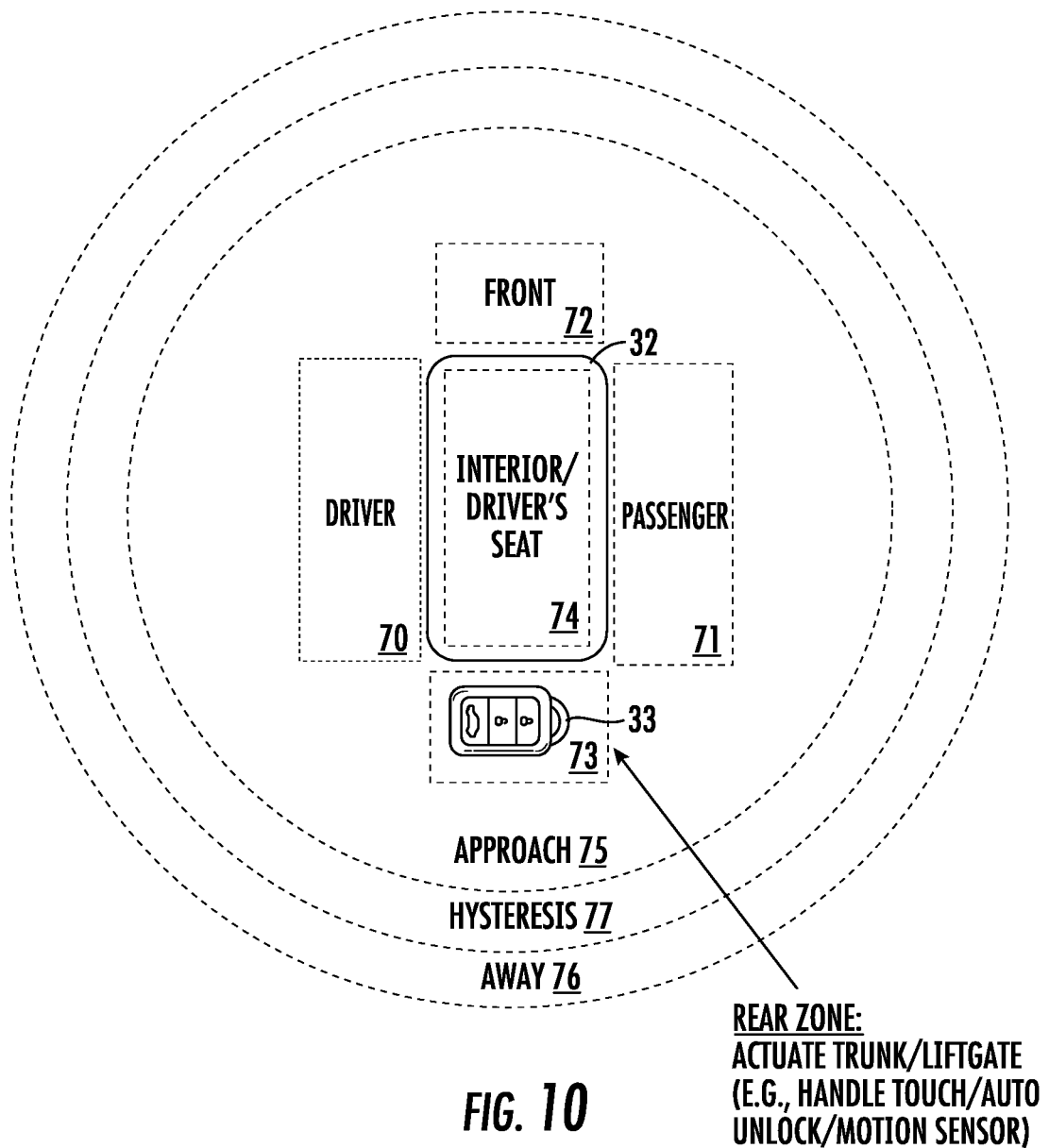
Figure 11:
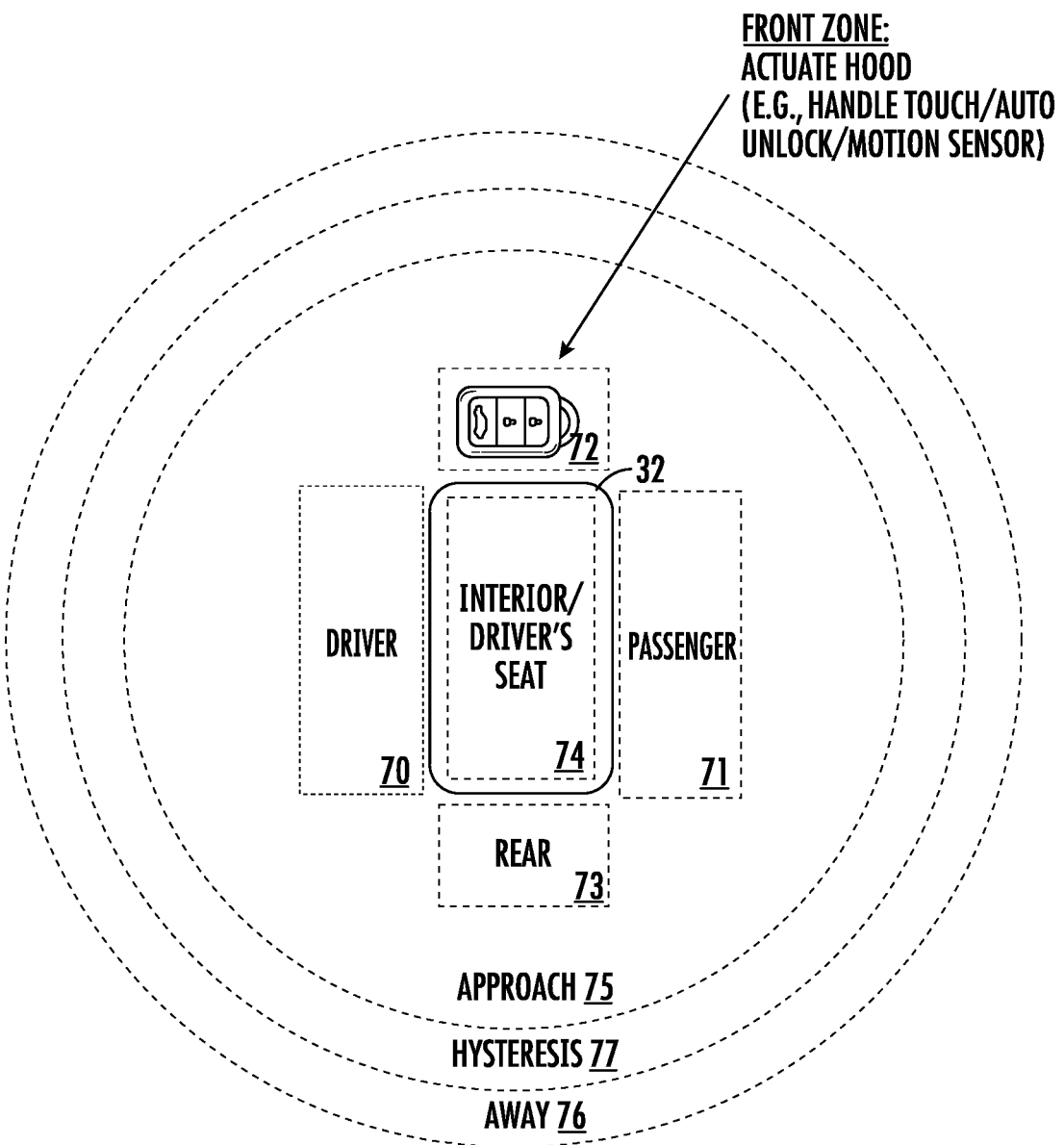

In the example of FIG. 9, the portable device 33 is within the passenger side zone 71, meaning that the user is on the passenger side of the vehicle 32. Example vehicle operations that may be associated with this zone 71 may include unlocking the passenger door (e.g., automatically or responsive to a handle touch), etc. In the example of FIG. 10, the mobile device 33 is within the rear zone 73 of the vehicle, meaning the user is at the rear of the vehicle 32. Example vehicle operations that may be associated with the rear zone 73 may include actuating a trunk or liftgate (e.g., automatically or responsive to a handle touch/motion sensor), etc. In the example of FIG. 11, the mobile device 33 is within the front zone 72, meaning that the user is at the front of the vehicle 32. Example vehicle operations that may be associated with the front zone 72 include releasing a hood latch (e.g., automatically or responsive to a handle touch/motion sensor), etc. By way of example, an approximate distance threshold for each of these zones may be in a range of 1-2 meters around the vehicle 32, and more particularly around 1.5 meters from the skin of the vehicle, although different ranges may be used in different embodiments.

Figure 12:
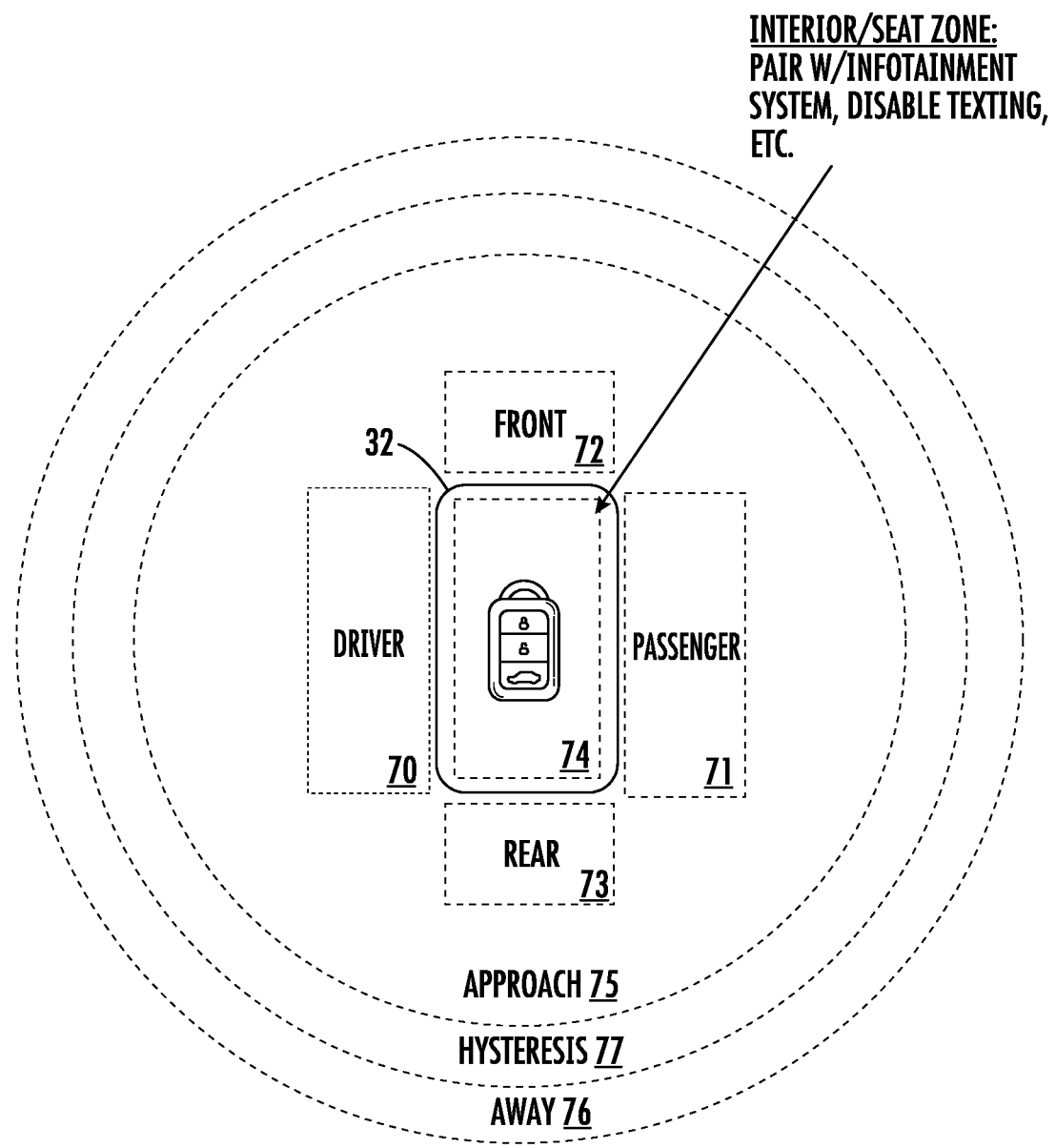

In the example of FIG. 12, the mobile device 33 is in the interior zone 74, meaning that the user is inside the vehicle 32. As noted above, example operations that may be associated with the interior zone 74 include disabling certain driver mobile device functions (e.g., texting, etc.), pairing the mobile device to an infotainment system, etc. Here again, the interior zone 74 may be reduced or sub-divided into a smaller zone(s) for different functions, if desired.

An example approach for determining the location of an end user about the vehicle 32 by the controller 34 is now described. The location may be determined using the RSSI values of the connection between the mobile device 33 and all of the wireless transmitters 31*a*-31*d* onboard the vehicle 32. More particularly, the location may be determined using the following steps:

1. Log the RSSI values from each of the wireless transmitters 31*a*-31*d* by the mobile device 33, all at the same timestamp (or relatively close).
2. Group these values into an ordered array, where the order is defined currently by the minor value of the sensor (packet) in the case of a BLE transmitter (other orders may be appropriate for different wireless formats, as will be appreciated by those skilled in the art).
3. Process and "clean" the data logged on the mobile device 33 (example data cleaning processes for Android and iOS operating systems will be discussed further below).
4. Report the data from the mobile device 33 to the controller 34 at the vehicle 32.
5. Run a localization algorithm at the controller 34, using the ordered array of sensor RSSIs as inputs to the trained model, to determine location.
6. Report the predicted location back to the end user (mobile device 33).

The following are example approaches that may be used for "cleaning" RSSI data for Android and iOS operating systems. More particularly, in certain instances the RSSI data may be relatively noisy, in that there is a lot of meaningless data associated with each log. Generally speaking, Android devices do not have an internal operating system functionality to "clean" the data initially like there is on iOS counterparts, which automatically removes outliers, gets better signals, etc. Furthermore, the sampling rate is variable on Android devices, but this is not the case on iOS devices (it strictly samples every 1 second). Furthermore, different types of Android devices have different Bluetooth modules, i.e., there is not a set standard among Android devices.

Given the foregoing, to provide a unification of input between both platforms, the controller 34 may pre-process the data to put it into a uniform format for location determination processing. An example approach to preprocess Android data to unify it with data that emanates from an iOS platform is detailed below.

1. Use a sampling interval of 100 ms (0.1 s), and take 10 samples of all N onboard sensors forming a column array.
2. If any column input>MAX_RSSI, then set it to MAX_RSSI.
3. If any column input<MIN_RSSI, then set it to MIN_RSSI.
4. Take the average of each column matrix, excluding any dropped signals from the averaging.
5. If column average:=DROPPED_SIG, then set it to MAX_RSSI.
6. Take the averaged (cleaned) input of each column and form an input array to the localization algorithm.

Unlike Android, iOS devices may provide a more stable platform for logging RSSI, such that not much pre-processing needs to be done since, in the present example, it is intended that the Android data is to be made to look like the iOS data. Some features that iOS devices provide that are useful for this purpose include: unity across generations of devices, as newer/older iPhones generally operate with the similar chipsets and internal functionality on Bluetooth data; and internal and inherent RSSI processing that reports clean, imputed (removed of outliers) RSSI logs with relatively little noise. With respect to iOS logged data, the following may be performed:

1. For every i:=0 to NUM_SENSORS . . .
   a. If RSSI_LOG[i]>MAX_RSSI, then RSSI_LOG[i]:= MAX_RSSI b. If RSSI_LOG[i]<MIN_RSSI, then RSSI_LOG[i]:=MIN_RSSI
c. If RSSI_LOG[i]==DROPPED_SIG, then RSSI_LOG[i]=MAX_RSSI Further details regarding machine learning approaches for generating model training data are now provided. At a high level the model performs the following functions: determine the true weights and biases between all nodes (i.e., wireless transmitters 31a-31d) in the network, and internally model how they operate with respect to each other; create a mathematical model based on these inputs, weights and biases that will fit its curve as close to optimally as possible, and allow room for outlier data to be mapped to its true output with precision and accuracy; and use its learning ability to make the use of hard-coded thresholds in core-localization obsolete.

In a neural network approach, the neural network is a machine learning mathematical abstraction that is modeled loosely after the human brain. It includes elements that can be mathematically abstracted that accurately represent how a human brain makes decisions, makes associations, etc. A node is the fundamental, atomic unit of a neural network. Mathematically speaking, it can be seen as just a function or computation. It combines the input from the user (or from a previous node) with a set of coefficients (i.e., weights) that either amplify or dampen the input, similar to a brain neuron in which certain inputs are more significant for a situation than others. These products are summed up and passed through the node's activation function to determine to what extent that node will be activated, if at all. If a signal passes through the node, this is known as the node firing.

The mathematical abstraction of a node previously described, in which it represents that of a neuron of a human brain, is widely used in a typical neural network. The nodes that are firing may send their outputs to even more nodes, a concept known as deep learning. A layer in a neural network is a set of N nodes that will either turn on (firing) or off (not firing). In mathematical terms, a neural network can usually be referred to as a dense graph, meaning that all the nodes from some arbitrary layer will connect to all the nodes in the next sequential layer. This means that each node in any layer will have input data from all the nodes from the previous layer. The goal of deep learning is to have certain inputs/outputs of layers create unique numerical (node) patterns which may be interpreted as a motivated output.

To generate a neural network model that accurately predicts a desired classification scheme, it is trained for the input it is supposed to take. This process in particular is called supervised learning, since you follow two basic steps in the process:
1. Feed the model with N input values (the number of sensors of input, a.k.a the number of nodes in the input layer); and
2. Inform the model that these inputs will map to a specific output (one of the output nodes).

For a neural network to learn, it should be able to determine how "wrong" it was during the training step. This is done with two mathematical concepts: a loss function and an optimizer for that loss function. A loss function in its simplest form is comparable to a cost function in economics. After a training epoch (iteration), to make the model better, the model validates the training data against itself, thus making predictions of data it has seen before. The loss function will then calculate the difference between what was predicted, and what the actual output should have been, which is used by the optimizer. The optimizer is simply a way to evaluate the loss of a single iteration, and backpropagates through the neural net to adjust the weights and biases between the edges.

To visualize this, one may think of the loss of a training epoch as a curve. The optimizer's job is to minimize the curve by tweaking the weights and biases and running again. This is commonly done using the partial derivative $\nabla$, in other terms, the gradient of the loss function. Once this is taken, it moves the weights and biases in the opposite direction of the gradient, then runs again until it is close to optimal.

In an example neural networks approach, training data is fed through a framework over the course of a training session (e.g., 5 minutes, although other time periods may also be used) to model interior parameters. Then a test data set may be run through the model to test its accuracy, and an additional training session(s) may be performed if further model accuracy is desired. The model may then be converted to a binary file that is uploaded into the embedded system of the controller 34, which may then input the reported RSSI data to the model to predict the location of the mobile device 33. Not only does this approach allow for localization determinations by the controller 34 without the need for any external processing, it avoids the need to load extraneous data used for the testing/training to the controller 34, as the controller may perform its localization processing based upon just the uploaded model binary file, as will be appreciated by those skilled in the art. The following are further details on a neural networks approach which may be used in an example implementation:
1. Create an input layer that has as many nodes as there are inputs:
    a. In an example embodiment, there are seven different wireless transmitters reporting, so, there will be an input layer of 7.
2. Create an arbitrary amount of hidden layers:
    a. A hidden layer is a layer that allows the neural network to form more complex patterns;
    b. More neurons are firing/not firing from inputs of the previous layer(s), allowing for more granular, and complex patterns to form;
    c. A hidden layer possess the activation functions that were discussed prior, these will determine how to allow nodes to fire;
    d. More layers cost more time and memory.
3. Create an output layer that has as many nodes as there are possible outputs or states:
    a. For the present embodiment, there are six different zones, so there will be an output layer of 6;
    b. The output layer will output scores of each class, the highest score will be the predicted index (node).
4. Compile the model with learning parameters:
    a. These include optimizations for the cost function (loss) and the optimizer described previously.
5. Feed the model inputs as an array of the size of the # of input nodes, and an output (class) will be predicted.

In accordance with one example implementation, a localization algorithm running on the controller 34 uses a neural network machine model to make predictions regarding the zone in which the user is currently located. The neural network model is actually running onboard the vehicle at the controller 34. That is, no cloud computing component is involved for the machine learning operations and processing. The following is an example neural network specification which may be used, although other approaches/settings may be used in different embodiments:

Neural network backend—TensorFlow Lite by Google
Number of inputs—seven (7)
Number of outputs—six (6), returns probability scores
Hidden layers . . . .
  H1—128 nodes, rectified-linear unit activation
  H2—128 nodes, rectified-linear unit activation
Loss & optimization . . . .
  Loss—sparse categorical cross entropy
  Optimizer—ADAM optimizer The following is example embedded neural network specification:
  Core—TensorFlow Lite (from TensorFlow model) ported to C wrapper
  Binary size—roughly 75 kB The above-described approach advantageously capitalizes on robust machine learning algorithms as its core inference (prediction) maker on exterior zones about an object (vehicle), removing the need for hard-coded thresholds and filters for different scenarios as other methods have used in prior systems. One advantageous characteristic about this approach is that it allows for predictions using resource-constrained embedded systems (i.e., machine learning has a stigma of only being capable of running efficiently on resource-plentiful computers, clouds, etc., but the present approach allows for local processing).

Furthermore, the above-described approach may advantageously avoid angles or distances like other localization methods using machine learning require. For example, existing locating approaches using BLE, UWB, etc. with machine learning typically use some form of distance regression output from machine learning algorithms. Still another advantage is that this approach makes predictions on exterior zones or locations, whereas other prior approaches typically use some form of indoor triangulation via machine learning with similar sensors to determine location.

It should be noted that the above-described approaches may be used on more than just automobiles in some implementations. For example, one such implementation may include using sensors around the exterior walls of a building and creating custom zones of location.

Figure 13:
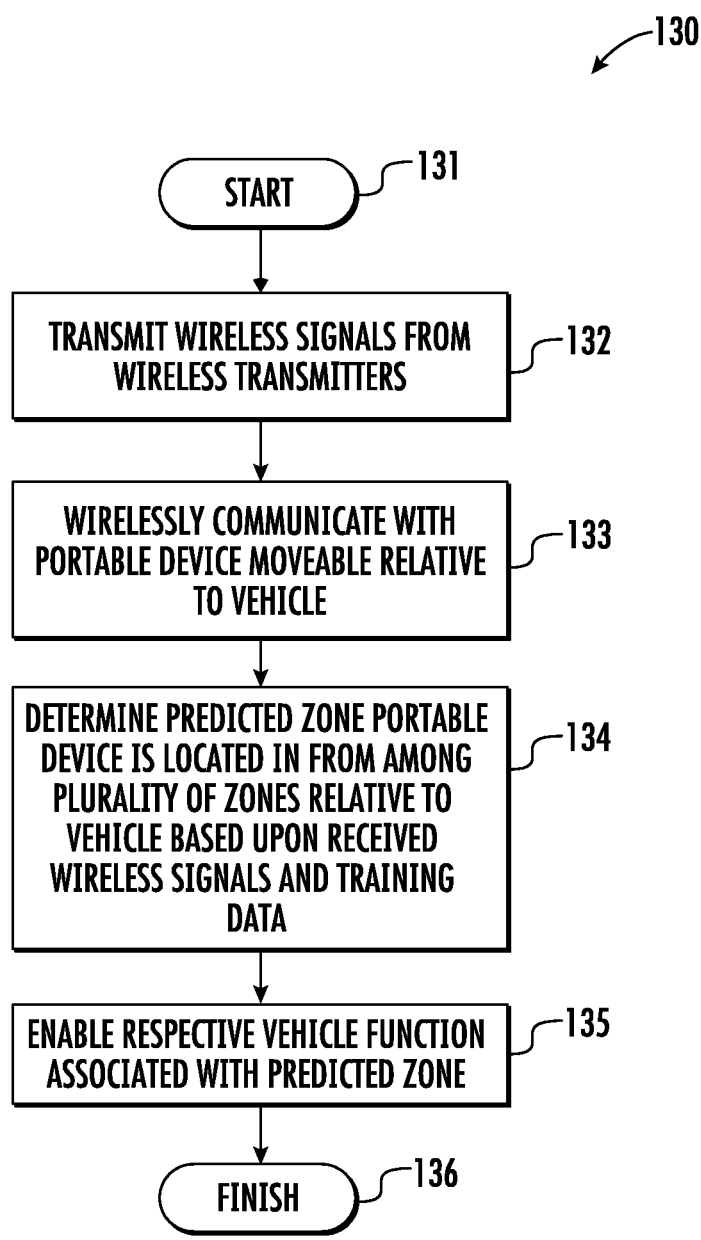
FIG. 13 is a flow diagram illustrating example method aspects associated with the system of FIG. 6.

A related method is now described with reference to the flow diagram 130 of FIG. 13. Beginning at Block 131, the method illustratively includes transmitting wireless signals from a plurality of wireless transmitters 31a-31d carried by a vehicle 32 at spaced apart locations, at Block 132. The method also illustratively includes, at a controller 34 carried by the vehicle 32, wirelessly communicating with a portable device 33 moveable relative to the vehicle and configured to receive the wireless signals from the plurality of wireless transmitters 31a-31d, at Block 133. The method further illustratively includes determining a predicted zone the portable device 33 is located in from among a plurality of zones 70-77 relative to the vehicle 32 based upon the received wireless signals and training data (e.g. a trained model) (Block 134), with the zones having respective vehicle functions associated therewith, and enabling the respective vehicle function associated with the predicted zone (Block 135), as discussed further above. The method of FIG. 13 illustratively concludes at Block 136.

Figure 14:
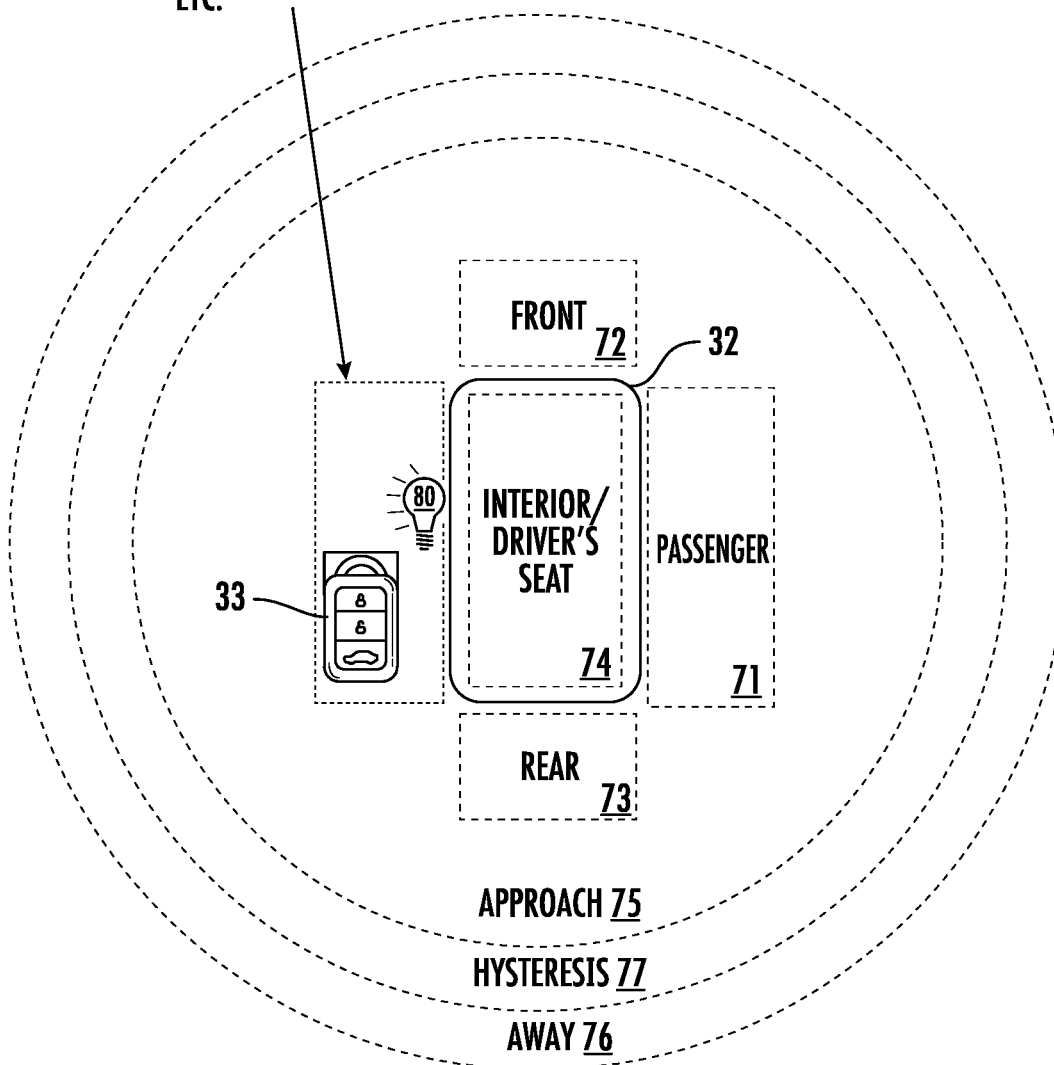
FIG. 14 is a schematic diagram of the vehicle system illustrating a visual indication of the user location.
Figure 15:
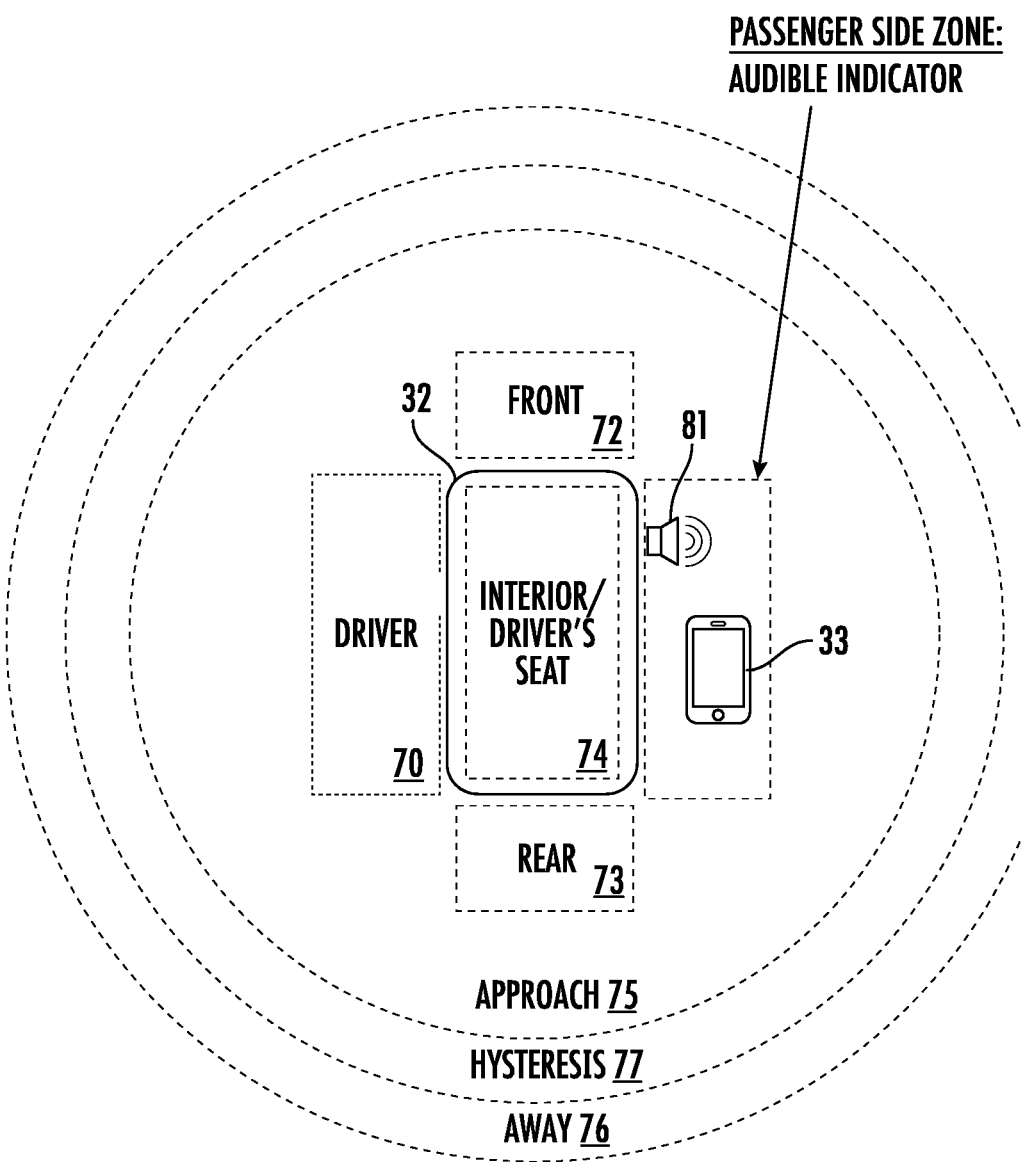
FIG. 15 is a schematic diagram of the vehicle system illustrating audible indication of the user location.

Turning now to FIGS. 14 and 15, in accordance with other example embodiments one or more status indicators may be paired with different zones 70-77 to alert users of the portable device 33 that the controller 34 has connected to and registered the portable device in a particular zone. In the example illustrated in FIG. 14 one or more exterior lights 80 are used on the vehicle 32 to demonstrate the connection state and zone 70-77 in which the portable device 33 is located. In the present example the portable device 33 is a fob. By way of example, for the near zones 70-74 respective multi-color underbody light bars may be used to illuminate the ground, showing which side the portable device was detected approaching. For instance, the underbody on the independent zones 70-74 respectively associated with the driver, passenger, front and rear sides of the vehicle 32 may glow when the portable device 33 is determined to be within the respective zone. Thus, for example, the exterior lights 80 associated with each zone 70-73 may be illuminated as the user carries the portable device 33 around the vehicle 32 between the different zones (i.e., as the user walks around the vehicle). In the illustrated example, the user has approached the driver side zone 70, causing the exterior light 80 for this zone to illuminate.

In an example configuration, one or more of these exterior lights 80 may illuminate and/or blink if the portable device 33 is detected within the approach zone 75. Moreover, the illumination or blinking may stop (lights out) if the portable device 33 is within and/or outside of the away zone 76 after a time-out period. Furthermore, the entire underbody (i.e., all of the exterior lighting 80) may glow a different color if the portable device 33 is detected inside the vehicle 32, and the exterior lights may be suppressed as soon as the vehicle is turned on. Generally speaking, the lights 80 may change colors, blinking patterns, etc., based upon status and location changes as desired. The visual indication may also be provided by existing vehicle lights, such as tail lights, head lights, or turn signal lights, for example.

In the example illustrated in FIG. 15, audible indicators 81 may similarly be associated with one or more of the near zones 70-74. That is, similar to the above-described configuration with the exterior lighting 80, when the portable device 33 (which in the illustrated configuration is a smart phone) enters within the passenger size zone 71 the audible indicator 81 may sound a chirp or other noise on that side of the vehicle 32. In other words, a directional sound emanating from the side of the vehicle 32 that the user is approaching lets the user know that her portable device 33 has been wirelessly connected and its location has been detected. It should be noted that both exterior lighting and audible indicators 80, 81 may be used together in some embodiments as well. Generally speaking, various types and/or patterns of sounds (e.g., chirps/beeps) may be used to provide different status/location indications. In this regard, a single audible indicator 81 may be used (instead of directional audible indicators associated with each zone 70-73), but it may use a different pattern to indicate approaches from different directions (e.g., one beep or tone type for approaching the driver zone 70, two beeps or a different tone type for approaching the passenger zone 71, etc.).

With respect to portable devices 33 such as smart phones, there may be situations where the smart phone does not register with the controller 34 for reasons that have nothing to do with the controller or system 30, such as app or operating systems changes on the smart phone (software updates, etc.), user actions like shutting off Bluetooth, etc. The above-described feedback techniques may accordingly be helpful to users in this regard to quickly inform users of smart phones, etc. when there is a problem with the device that is causing an interruption in service by the system 30.

It should also be noted that while the above-noted embodiments are described with respect to multiple zones 70-77 about the vehicle 32, in some configurations a single wireless transmitter or beacon (e.g., a BLE beacon) be used to define a single zone around the vehicle instead of multiple different zones. However, in such a configuration, the visual and/or audible zone identification techniques may be used in a similar manner as described above, as will be appreciated by those skilled in the art.

Figure 16:
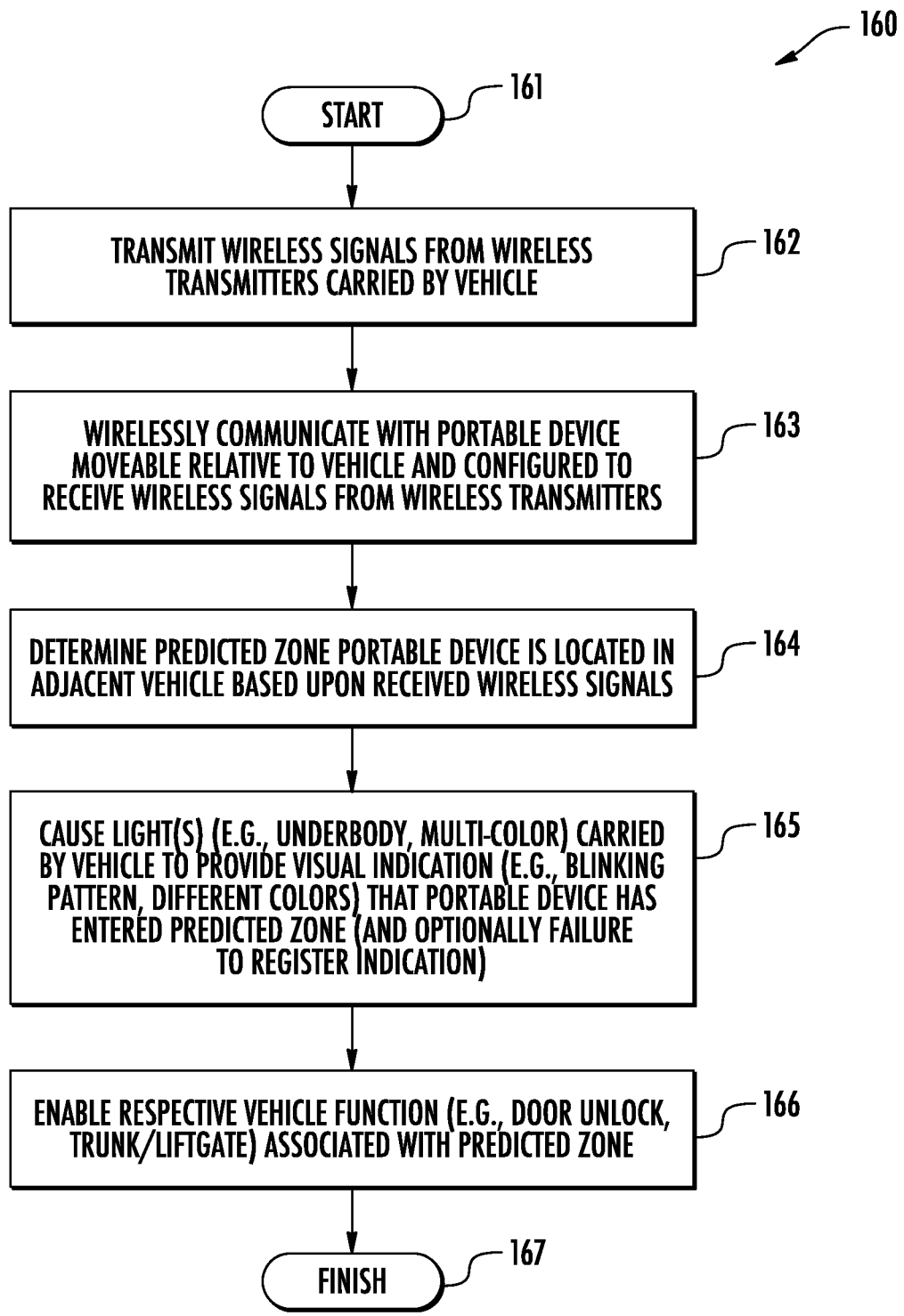
FIG. 16 is a flow diagram illustrating example method aspects associated with the configuration of FIG. 14.

Referring additionally to the flow diagram 160 of FIG. 16, method aspects associated with the example configuration shown in FIG. 14 are now further described. Beginning at Block 161, wireless signals are transmitted from the wireless transmitters 31a-31d carried by the vehicle 32, at Block 162, and the controller 34 wirelessly communicates with the portable device 33 which is moveable relative to the vehicle and configured to receive the wireless signals from the transmitters (Block 163), as discussed further above. The method further illustratively includes determining a predicted zone from among the zones 70-77 the portable device 33 is located in adjacent to the vehicle 32 based upon the received wireless signals (Block 164), as also discussed above. Here again, the different zones 70-77 may have respective vehicle functions associated therewith, and the method may further include, at the controller 34, causing the visual indicator 80 to provide a visual indication that the portable device 33 has entered the predicted zone, at Block 165, and enabling the respective vehicle function associated with the predicted zone (Block 166). The method of FIG. 16 illustratively concludes at Block 167.

Figure 17:
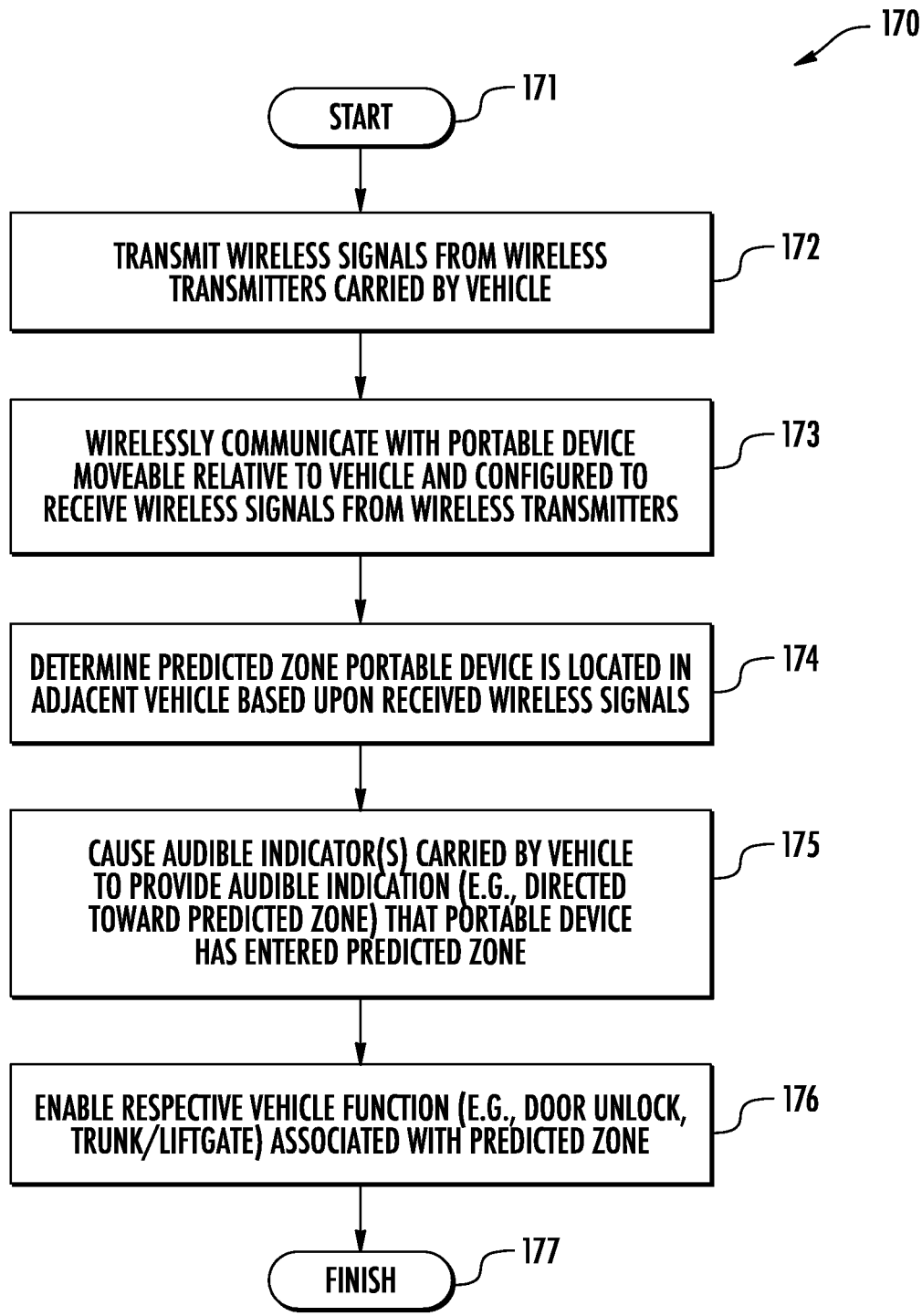
FIG. 17 is a flow diagram illustrating example method aspects associated with the configuration of FIG. 15.

Referring additionally to the flow diagram 170 of FIG. 17, method aspects associated with the example configuration shown in FIG. 15 are now further described. Beginning at Block 171, wireless signals are transmitted from the wireless transmitters 31a-31d carried by the vehicle 32, at Block 172, and the controller 34 wirelessly communicates with the portable device 33 which is moveable relative to the vehicle and configured to receive the wireless signals from the transmitters (Block 173), as discussed further above. The method further illustratively includes determining a predicted zone from among the zones 70-77 the portable device 33 is located in adjacent to the vehicle 32 based upon the received wireless signals (Block 174), as also discussed above. The method further illustratively includes, at the controller 34, causing the audible indicator 81 to provide an audible indication that the portable device 33 has entered the predicted zone, at Block 175, and enabling the respective vehicle function associated with the predicted zone (Block 176). The method of FIG. 17 illustratively concludes at Block 177.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A vehicle system comprising:
    a plurality of wireless transmitters carried by a vehicle and configured to transmit wireless signals;
    at least one indicator carried by the vehicle;
    a portable device moveable relative to the vehicle and configured to receive the wireless signals from the plurality of wireless transmitters; and
    a controller carried by the vehicle and configured to
        wirelessly communicate with the portable device,
        determine a predicted zone the portable device is located in adjacent to the vehicle based upon the received wireless signals and training data determined based upon a machine learning algorithm, the predicted zone being one of a plurality of different zones adjacent the vehicle having respective vehicle functions associated therewith,
        cause the at least one indicator to provide an indication that the portable device has entered the predicted zone, and
        enable the respective vehicle function associated with the predicted zone.

2. The vehicle system of claim 1 wherein one of the plurality of different zones corresponds to a driver side of the vehicle; and wherein the respective vehicle control function for the zone corresponding to the driver side of the vehicle comprises unlocking at least a driver's door.

3. The vehicle system of claim 1 wherein one of the plurality of different zones corresponds to a rear of the vehicle; and wherein the respective vehicle function for the zone corresponding to the rear of the vehicle comprises actuating at least one of a vehicle trunk and liftgate.

4. The vehicle system of claim 1 wherein the machine learning algorithm comprises at least one of a neural network, a gradient boosting tree, a naïve Bayes classification, a K-nearest neighbor classification, and a support vector machine.

5. The vehicle system of claim 1 wherein the machine learning comprises supervised machine learning.

6. The vehicle system of claim 1 wherein the controller comprises a memory storing a previously trained supervised machine learning model.

7. The vehicle system of claim 1 wherein the at least one indicator comprises at least one underbody light carried underneath the vehicle and directed at the ground.

8. The vehicle system of claim 1 wherein the at least one indicator comprises a respective light corresponding to each of the plurality of different zones.

9. The vehicle system of claim 1 wherein the plurality of zones comprises at least one exterior zone adjacent the vehicle and an interior zone within the vehicle; wherein the at least one indicator comprises at least one multi-color light; and wherein the controller is configured to cause the at least one multi-color light to provide different color indications with respect to the at least one exterior zone and the interior zone.

10. The vehicle system of claim 1 wherein the at least one indicator comprises at least one of tail lights, head lights, and turn signal lights.

11. The vehicle system of claim 1 wherein the at least one indicator comprises at least one light; and wherein the controller is configured to cause the at least one light to provide a visual indication having a blinking pattern.

12. The vehicle system of claim 1 wherein the at least one indicator comprises at least one multi-color light; and wherein the controller is configured to cause the at least one multi-color light to provide a visual indication that changes color based upon location changes of the portable device.

13. The vehicle system of claim 1 wherein the at least one indicator comprises at least one audible indicator; and wherein the controller is configured to cause the at least one audible indicator to provide an audible indication directed toward the predicted zone.

14. The vehicle system of claim 1 wherein the portable device comprises a smart phone; and wherein the controller is further configured to cause the at least one indicator to provide a failure indication responsive to a failure to register with the smart phone.

15. A vehicle system comprising:
    a plurality of wireless transmitters carried by a vehicle and configured to transmit wireless signals;
    at least one indicator carried by the vehicle; and a controller carried by the vehicle and configured to
wirelessly communicate with a portable device moveable relative to the vehicle and configured to receive the wireless signals from the plurality of wireless transmitters,
determine a predicted zone the portable device is located in adjacent to the vehicle based upon the received wireless signals and training data determined based upon a machine learning algorithm, the predicted zone being one of a plurality of different zones adjacent the vehicle having respective vehicle functions associated therewith,
cause the at least one indicator to provide an indication that the portable device has entered the predicted zone, and
enable the respective vehicle function associated with the predicted zone.

16. The vehicle system of claim 15 wherein one of the plurality of different zones corresponds to a driver side of the vehicle; and wherein the respective vehicle control function for the zone corresponding to the driver side of the vehicle comprises unlocking at least a driver's door.

17. The vehicle system of claim 15 wherein one of the plurality of different zones corresponds to a rear of the vehicle; and wherein the respective vehicle function for the zone corresponding to the rear of the vehicle comprises actuating at least one of a vehicle trunk and liftgate.

18. The vehicle system of claim 15 wherein the at least one indicator comprises at least one underbody light carried underneath the vehicle and directed at the ground.

19. The vehicle system of claim 15 wherein the at least one indicator comprises a respective light corresponding to each of the plurality of different zones.

20. The vehicle system of claim 15 wherein the at least one indicator comprises at least one audible indicator; and wherein the controller is configured to cause the at least one audible indicator to provide an audible indication directed toward the predicted zone.

21. A method comprising:
transmitting wireless signals from a plurality of wireless transmitters carried by a vehicle; and
at a controller carried by the vehicle,
wirelessly communicating with a portable device moveable relative to the vehicle and configured to receive the wireless signals from the plurality of wireless transmitters,
determining a predicted zone the portable device is located in adjacent to the vehicle based upon the received wireless signals and training data determined based upon a machine learning algorithm, the predicted zone being one of a plurality of different zones adjacent the vehicle having respective vehicle functions associated therewith,
causing at least one indicator carried by the vehicle to provide an indication that the portable device has entered the predicted zone, and
enabling the respective vehicle function associated with the predicted zone.

22. The method of claim 21 wherein one of the plurality of different zones corresponds to a driver side of the vehicle; and wherein the respective vehicle control function for the zone corresponding to the driver side of the vehicle comprises unlocking at least a driver's door.

23. The method of claim 21 wherein one of the plurality of different zones corresponds to a rear of the vehicle; and wherein the respective vehicle function for the zone corresponding to the rear of the vehicle comprises actuating at least one of a vehicle trunk and liftgate.

24. The method of claim 21 wherein the at least one indicator comprises at least one underbody light carried underneath the vehicle and directed at the ground.

25. The method of claim 21 wherein the at least one indicator comprises a respective light corresponding to each of the plurality of different zones.

26. The method of claim 21 wherein the at least one indicator comprises at least one audible indicator; and wherein the controller is configured to cause the at least one audible indicator to provide an audible indication directed toward the predicted zone.

* * * * *